(12) United States Patent
Pascucci et al.

(10) Patent No.: US 8,089,039 B2
(45) Date of Patent: Jan. 3, 2012

(54) OPTO-ELECTRONIC ARRANGEMENT TO CAPTURE RELATIVE MOVEMENTS OR RELATIVE MOVEMENTS OR RELATIVE POSITIONS OF TWO OBJECTS, AND DESIGN METHODOLOGY

(75) Inventors: Antonio Pascucci, Seefeld (DE); Volker Senft, Seefeld (DE)

(73) Assignee: Societe Civile "Galileo" 2011, Monaco (MC)

( * ) Notice: Subject to any disclaimer, the term of this patent is extended or adjusted under 35 U.S.C. 154(b) by 1454 days.

(21) Appl. No.: 11/253,406

(22) Filed: Oct. 19, 2005

(65) Prior Publication Data

US 2006/0086889 A1    Apr. 27, 2006

(30) Foreign Application Priority Data

Oct. 22, 2004    (DE) .......................... 10 2004 051 565

(51) Int. Cl.
*H01J 40/14*    (2006.01)
(52) U.S. Cl. ....................................................... 250/221
(58) Field of Classification Search .................. 250/221, 250/239, 216, 551, 231.13; 356/614–621; 73/862.041–862.043, 862.324
See application file for complete search history.

(56) References Cited

U.S. PATENT DOCUMENTS

| | | | |
|---|---|---|---|
| 3,628,394 A | 12/1971 | Keatinge et al. | |
| 3,921,445 A | 11/1975 | Hill et al. | |
| 4,178,799 A | 12/1979 | Schmieder et al. | |
| 4,763,531 A | 8/1988 | Dietrich et al. | |
| 4,785,180 A | 11/1988 | Dietrich et al. | |
| 4,999,483 A | 3/1991 | Okamoto | |
| 5,648,851 A | 7/1997 | Kellner | |
| 6,753,519 B2 * | 6/2004 | Gombert | 250/221 |
| 6,804,012 B2 | 10/2004 | Gombert | |
| 2003/0102422 A1 | 6/2003 | Gombert | |

FOREIGN PATENT DOCUMENTS

| | | |
|---|---|---|
| DE | 27 27 704 C3 | 1/1979 |
| DE | 3240241 A1 | 5/1983 |
| DE | 36 11 337 A1 | 10/1987 |
| DE | 3611336 C2 | 10/1987 |
| DE | 43 08 456 C2 | 9/1994 |
| DE | 101 58 775 A1 | 6/2003 |
| DE | 101 58 776 A1 | 6/2003 |
| DE | 101 58 777 A1 | 6/2003 |
| GB | 2 110 228 A | 6/1983 |

* cited by examiner

*Primary Examiner* — Que T Le

(57) ABSTRACT

The invention concerns an opto-electronic arrangement for capturing relative movements or relative positions of two objects, including at least one position-sensitive detector. The opto-electronic arrangement is characterized in that the position-sensitive detector is illuminated by at least two light emission devices, to form two measuring cells with a common detector. The invention also concerns an opto-electronic arrangement to capture relative movements or relative positions of two objects, which can mainly capture only translatory movements. This invention also concerns a force and/or moment sensor, and a pan/zoom sensor with a first plate and a second plate, which are elastically joined to each other and movable relative to each other, characterized by such an opto-electronic arrangement to capture relative movements or relative positions of two objects.

36 Claims, 23 Drawing Sheets

OPTO-ELECTRONIC ARRANGEMENT TO CAPTURE RELATIVE MOVEMENTS OR RELATIVE MOVEMENTS OR RELATIVE POSITIONS OF TWO OBJECTS, AND DESIGN METHODOLOGY

BACKGROUND OF THE INVENTION

The invention concerns an opto-electronic arrangement to to capture relative movements or relative positions of two objects. This arrangement includes at least one position-sensitive detector, and each position-sensitive detector is illuminated by a light emission device, to form a measuring cell. The invention also concerns a force and/or moment sensor, which makes use of such an arrangement. Finally, the invention concerns a PC keyboard which has the force and/or moment sensor according to the invention.

For the computer user, it is becoming increasingly important to control three-dimensional movements via a peripheral device. A three-dimensional deflection is captured by the peripheral device and described as a translation (X, Y, Z) and/or a rotation (A, B, C) in space. The most important component is the sensor, which can measure the deflection in up to six (6) degrees of freedom.

PRIOR ART

DE-36 11 337 A1 discloses an opto-electronic arrangement which is housed in a plastic sphere, and can simultaneously capture six components, namely translations along three axes and angular rotations around three axes. For this purpose, six light-emitting devices are arranged in one plane at essentially the same angular distances from each other. A permanently arranged slotted diaphragm is connected in front of each light-emitting device. The relative movements or relative positions are detected by light-sensitive detectors, which are arranged so that they can move relative to the arrangement of light-emitting devices and slotted diaphragms, and the detector axis of which runs perpendicularly to the direction of the slots. The arrangement requires a relatively low design cost, since the light-emitting devices, diaphragms and other electronic devices as required for control and analysis can be arranged using conventional soldering technology on a single board, which can be permanently connected to a first object. The position-sensitive detectors are connected to the second object. However, it is disadvantageous that the arrangement takes up a relatively large area. The reason is the relatively large spatial extent of the diaphragms and detectors which are arranged in a ring around the light emission devices. This sets a limit to the miniaturisation of the arrangement.

Without any claim to completeness, other documents which show the technical background for the invention are: DE-27 27 704 C3, DE-36 11 336 C2, DE-32 40 241 A1, U.S. Pat. No. 3,921,445 and U.S. Pat. No. 3,628,394.

PROBLEM ON WHICH THE INVENTION IS BASED

Opto-electronic arrangements to capture relative movements or relative positions, as well as force and/or moment sensors which use such arrangements, gained significance in the past mainly in industrial applications. Examples are control of robots and measurement of forces on motor vehicle test and measuring stands. But commercially very interesting application possibilities for the arrangements and sensors exist mainly in the office sector and entertainment electronics. Here they have the function of an input device with which up to six components can be input, in contrast to a joystick, a mouse or a trackball, which in general allow only two components to be input. Simple, convenient input of six components, as is allowed by a force and/or moment sensor with an opto-electronic arrangement, is desirable, for instance, to control 3D design software and sophisticated computer games. However, input devices until now have been decidedly unwieldy because of the area/volume which they require, and this was essentially the reason they were not more widely used. Miniaturisation would allow them to be used in, for instance, games consoles, PC keyboards or notebook computers, and thus make a broad market penetration possible.

The typical 3D input devices are used for view manipulation of three-dimensional objects in 6 degrees of freedom simultaneously (6 DOF=3 translations and 3 rotations). The cap or sphere of the 3D input device is carried on springs, and allows arbitrary deflection in space (6 DOF). This group of input devices is aimed at customers with true 3D applications (6 DOF), such as Catia or other CAD applications.

As well as the true 6 DOF applications, there is also a large group of applications in which rotating an object is not desired. Examples of such applications are the Office products (Word, Excel, Powerpoint etc.) and image processing programs (Adobe Photoshop, Acrobat Reader etc.). The manipulated object is usually a two-dimensional master ("paper with writing or pictures"), and rotating the master is not desired. The customer still wishes to change the view, but only by shifting (pan—2 DOF) and enlarging/reducing (zoom—1 DOF) the object.

The aim of development for this customer group is to build an input device which is especially suitable for pan/zoom applications. In this way, the high cost of a full 3D sensor (6 DOF), in which the three rotational movements are simply ignored, could be saved.

Thus, starting from the prior art, this invention is based on the object of creating an arrangement for capturing the relative movements or relative positions of two objects, said arrangement allowing a more manoeuvrable design compared with known arrangements. For instance, the design of the arrangement could be more efficient and/or flexible, or require a smaller area. Also, the design of the arrangement could be more economical and/or be specially suitable for pan/zoom applications.

Additionally, the invention is based on the object of creating a force and/or moment sensor which also allows a more elegant design in comparison with known sensors. Finally, the invention is based on the object of creating an input device which is for use in the office and allows uncomplicated input of up to six force or torque components.

SOLUTION ACCORDING TO THE INVENTION

To achieve this object, the invention discloses an opto-electronic arrangement, which is defined by the features of Claim 1, 10, 22, 29 or 35, to capture relative movements or relative positions of two objects. The invention also discloses a force and/or moment sensor, which is defined by the features of Claim 42. Preferably, the force sensor is used as a pan/zoom sensor for image processing and other similar office applications. Finally, it also discloses a personal computer keyboard which is defined by the features of Claim 53. Structure and Further Development of the Solution According to the Invention An opto-electronic arrangement for capturing relative movements or relative positions of two objects according to one form of the invention includes at least one position-sensitive detector, and is characterized in that the position-sensitive detector is illuminated by at least two light emission devices, to form two measuring cells with a common detector.

Preferably, each of the two measuring cells which are formed by a common detector has a slotted diaphragm which is arranged in the beam path of the corresponding light emission device, between the said light emission device and the position-sensitive detector. Each position-sensitive detector can be to associated with two adjacent slotted diaphragms.

In a preferred version of the opto-electronic arrangement, a slot direction of at least one of the slotted diaphragms is aligned diagonally in relation to the light-sensitive part of the detector. In another preferred version of the opto-electronic arrangement, a light plane, which shines through at least one of the slotted diaphragms and falls on the detector, forms an angle with a plane of a light-sensitive part of the detector.

It is preferred that each detector is illuminated alternately (i.e. periodically) by a light emission device. A measurement value of the detector is read out simultaneously. In other words, the detector of each measuring cell is illuminated by only one light emission device at a particular time, and the measurement value of the detector is read out simultaneously.

Typically, the measuring cells with the common detector are arranged such that the beam paths which emanate from the light emission devices intersect and illuminate the same portion of the common detector in the plane of their intersection.

An opto-electronic arrangement according to a further form of the invention includes at least one position-sensitive detector, which is illuminated by a light emission device, to form a measuring cell, which also has a slotted diaphragm which is arranged in the beam path of the light emission device between the light emission device and the position-sensitive detector. This opto-electronic arrangement is characterized in that a light plane which shines through the slotted diaphragm and falls on the detector is oriented at an angle in relation to a light-sensitive part of the detector.

In a preferred version of the opto-electronic arrangement, the to light plane forms an angle with a plane of the light-sensitive part of the detector. Preferably, a slot direction of the slotted diaphragm runs essentially perpendicularly to the light-sensitive part of the detector.

In an alternative version of the opto-electronic arrangement, a slot direction of the slotted diaphragm is aligned diagonally in relation to the light-sensitive part of the detector.

In a preferred version of this opto-electronic arrangement of the invention, the position-sensitive detector is associated with two adjacent slotted diaphragms, said position-sensitive detector acting as part of two different measuring cells. Preferably, each slotted diaphragm is illuminated by its own light emission device, so that each position-sensitive detector is illuminated by two light emission devices, to form one measuring cell with a common detector.

In a particularly preferred configuration, each of the two adjacent slotted diaphragms is illuminated by a respectively arranged light emission device. The two adjacent slotted diaphragms can together enclose an angle, and can also preferably have slots which are arranged perpendicularly to each other.

An opto-electronic arrangement to capture relative movements or relative positions of two objects according to yet another form of the invention includes at least one position-sensitive detector, each position-sensitive detector being illuminated by its own light emission device, to form a measuring cell. This opto-electronic arrangement is characterized in that the measuring cells are arranged in groups, so that the measuring cells of each group are essentially arranged parallel or perpendicularly to each other.

In a preferred version of this opto-electronic arrangement, the measuring cells also each include a slotted diaphragm which is arranged in the beam path of the light emission device between the light emission device and the position-sensitive detector, a detector axis of the position-sensitive detector being aligned essentially perpendicularly to a slot direction of the slotted diaphragm. The detector axes of the position-sensitive detectors in each group of measuring cells are preferably arranged parallel to each other.

According to another form of the invention, an opto-electronic arrangement to capture relative movements or relative positions of two objects includes at least two position-sensitive detectors, each position-sensitive detector being illuminated by its own light emission device, to form a measuring cell. This opto-electronic arrangement is characterized in that all position-sensitive detectors and light emission devices are arranged in a common plane, and that the measuring cells are arranged parallel to Cartesian axes. The measuring cells can therefore be arranged essentially parallel to each other and/or essentially perpendicularly to each other.

In a preferred version of this opto-electronic arrangement, the measuring cells also each include a slotted diaphragm which is arranged in the beam path of the light emission device between the light emission device and the position-sensitive detector, a detector axis of the position-sensitive detector being aligned essentially perpendicularly to a slot direction of the slotted diaphragm.

In a preferred version of the opto-electronic arrangement of the invention, an element of each measuring cell, consisting of light emission device, slotted diaphragm and detector, is movable relative to the other two elements. The movable element is preferably arranged in the centre of rotation of the measuring cell, so that the measuring cell can generally only (i.e. exclusively) capture translatory movements. In principle, therefore, this measuring cell cannot capture rotational movements. Rotations can be captured only if the movable element is at a distance from the centre of rotation. If this distance from the centre of rotation is zero or minimal, the measuring cell is "blind" or "almost blind" to the rotational movement.

According to another form of the invention, an opto-electronic arrangement to capture relative movements or relative positions of two objects includes at least one position-sensitive detector, each position-sensitive detector being illuminated by a light emission device, to form a measuring cell, and the measuring cell also has a slotted diaphragm which is arranged in the beam path of the light emission device between the light emission device and the position-sensitive detector. One element of the measuring cell, consisting of light emission device, slotted diaphragm and detector, is movable relative to the other two elements, and the measuring cell can capture exclusively translatory movements. The movable element of the measuring cell may be arranged in the centre of rotation of the measuring cell. Preferably, the movable element of each measuring cell is arranged in the centre of rotation of the corresponding measuring cell.

In a preferred version of the opto-electronic arrangement of the invention, the arrangement includes at least three measuring cells, preferably from three to six measuring cells or even more than six measuring cells.

In a preferred version of the opto-electronic arrangement of the invention, at least one measuring cell consisting of light emission device, slotted diaphragm and detector is provided to with a movable light emission device, this measuring cell having a greater working range or movement range.

In a possible extension of the invention, all light emission devices, preferably infra-red light-emitting diodes (ILEDs) and position-sensitive detectors, preferably position-sensitive infra-red detectors, are arranged in a common (first) plane.

According to another aspect of the invention, a force and/or moment sensor is provided, which is characterized by an opto-electronic arrangement according to the invention to capture relative movements or relative positions of two objects. The two objects preferably consist of a first plate and a second plate, which are elastically joined to each other and movable relative to each other.

The 3D input devices according to the invention can be equated to a force and/or moment sensor. The translatory movements (X, Y, Z) correspond to the forces ($F_x$, $F_y$, $F_z$), and the rotational movements (A, B, C) correspond to the moments ($M_x$, $M_y$, $M_z$). A pan/zoom sensor corresponds to a force sensor ($F_x$, $F_y$, $F_z$), since the pan/zoom sensor can capture only translatory movements (X, Y, Z).

Other preferred arrangements of the invention are disclosed in the independent claims and in the following description of embodiments.

BRIEF DESCRIPTION OF DRAWINGS

Embodiments are shown in the following figures. Components with identical or similar functions are marked with the same reference symbols.

DETAILED DESCRIPTION OF THE EMBODIMENTS

Optical Sensor

Figure 1:
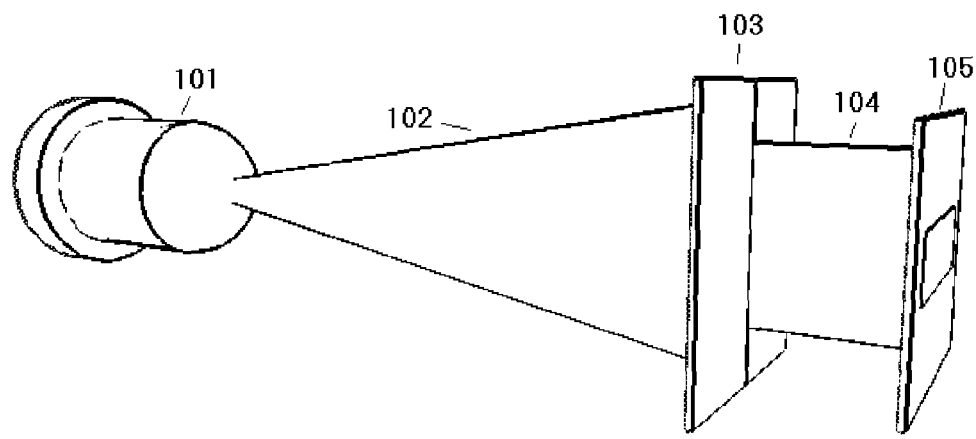
FIG. 1 shows a measuring cell, consisting of a LED (light-emitting diode), a diaphragm and a PSD (position sensitivity detector)

Sensors for capturing a three-dimensional deflection are built up of optical elements. The arrangement of a LED (light emitting diode), a diaphragm and a PSD (position sensitivity detector) as the measuring cell of a complete sensor has proved itself. In FIG. 1, a schematic view of a single measuring cell to is shown. Since the fundamental arrangement of the elements of a measuring cell is essentially similar in all attached Figures, the elements of the measuring cells are only designated with reference numerals in FIG. 1. Nevertheless, it is apparent that the elements (LED, diaphragm, PSD) and the structure of the measuring cells shown in the respective Figures correspond to the measuring cell as illustrated in FIG. 1.

A LED 101 emits a light cone 102, which strikes a slotted diaphragm 103, and the remaining light plane 104 beyond the diaphragm 103 intersects a one-dimensional PSD 105. The intersection point of the light plane 104 with the PSD 105 can be described by a scalar factor λ, which indicates the signed distance of the intersection point on the PSD 105 from the resting (initial) position. Subsequently, the factor λ is understood as the determined voltage of the PSD 105. An important property results from the arrangement of the three optical elements into a measuring cell. The measuring cell captures particular movements (X, Y, Z, A, B or C), and cannot simultaneously measure other movements. Thus each individual measuring cell can be seen as the sensor for particular movements. The sum of all captured movements gives the measurement space of the complete sensor.

Parameters of a Measuring Cell

Figure 2:
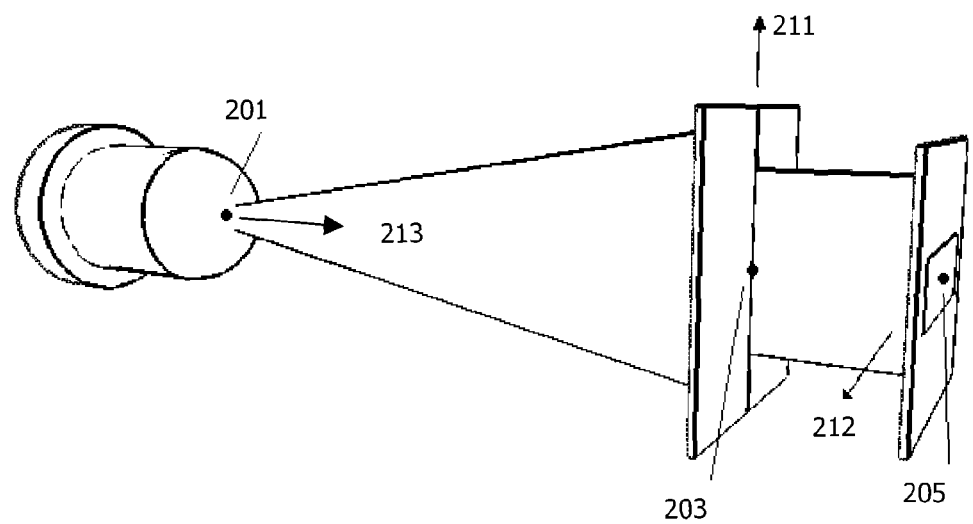
FIG. 2 shows the parameters of a measuring cell according to FIG. 1.

For the precise description of the measuring cell, the positions of the Led 101, diaphragm 103 and PSD 105 are required. To give the position, in the case of the LED 101 the source of the generated light is used. In the cases of the diaphragm 103 and PSD 105, the centre of the optical element is used. This is not absolutely necessary, but makes the further calculation clearer and has the effect that the scalar factor to in the resting position has the value λ=0. Additionally, the direction of the slot in the diaphragm 103 and the direction of the position-sensitive area of the PSD 105 are required. FIG. 2 shows the necessary positions and directions which describe the measuring cell.

201 LEDpos position of LED
    203 IRISpos position of diaphragm (centre)
    211 IRISdir direction of slot in diaphragm
    205 PSDpos position of PSD (centre)
    212 PSDdir direction of light-sensitive part of PSD Parameters of the Measuring Cell In the definition of the parameters, some assumptions apply. The light cone 102 of the LED 101 throws its light on the diaphragm 103, and the resulting light plane 104 intersects the PSD 105 in the whole working range.

For the later considerations, it is useful to define the viewing direction of the LED 101. It is given by the LED position 201 and diaphragm position 203, and by the LED position 201 and PSD position 205. It is assumed that the three points (LEDpos, IRISpos and PSDpos) are arranged so that they are in a straight line.

$$LEDdir = \frac{IRISpos - LED}{|IRISpos - LED|} = \frac{PSDpos - LED}{|PSDpos - LED|}$$

The vector of the viewing direction LEDdir 213 is standardised to the length 1. The standardisation to the length 1 also applies to the direction 211 of the slotted diaphragm 103 and the direction 212 of the light-sensitive area of the PSD 105.

The thickness of the slotted diaphragm and of the position-sensitive area is seen as ideally thin. When the intersection of the light plane 301 with the PSD 302 is idealised, the result is an intersection point 304, not an intersection plane 303. The magnitude $\lambda$ indicates the distance of the intersection point 304 from the resting position. The result is positive values for the magnitude $\lambda$ if the intersection point 304 moves from the resting position in the direction PSDdir 212, and negative values for the opposite deflection. Obviously, the magnitude $\lambda$ can be defined arbitrarily differently, and the resting position does not necessarily have to be in the centre. A different definition affects the calculation/working range of the individual measuring cells, but not the basic function or the arrangement of multiple measuring cells.

Figure 3:
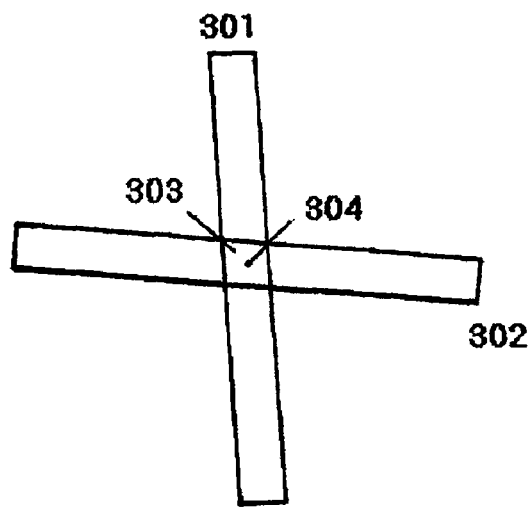
FIG. 3 shows the considerations about the intersection plane and idealised intersection point.

In FIG. 3, the considerations about the intersection plane 303 and idealised intersection point 304 are shown.

Later, the distance of the intersection point 304 from the resting position (magnitude $\lambda$) is indicated by a voltage $U_{1...6}$ of the associated PSD 302. The greater the amount of the voltage, the greater is the distance of the intersection point 304 from the resting position. The sign of the voltage indicates on which side (PSDdir 212) of the resting position the intersection point 304 is.

Calculation of the Intersection Point The measuring cell captures the movement of the three optical elements relative to each other. The value A is determined. It is assumed that one optical element (LED, diaphragm or PSD) moves, and the other two elements are in fixed positions. The case of two optical elements moving can be transferred to the case of one optical element moving, provided that the movable elements move in the same way (rigidly coupled). The result is three different scenarios:
Captured Movement 1. <u>LED movable</u>

$$\lambda = \frac{[\text{Rotate} \cdot (LED + \text{Translate}) - PSDpos] \cdot ([\text{Rotate} \cdot (LED + \text{Translate}) - IRISpos] \times IRISdir)}{PSDdir \cdot ([\text{Rotate} \cdot (LED + \text{Translate}) - IRISpos] \times IRISdir)}$$

2. <u>Diaphragm movable</u>

$$\lambda = \frac{(LED - PSDpos) \cdot [(LED - \text{Rotate} \cdot (IRISpos + \text{Translate})) \times (\text{Rotate} \cdot IRISdir)]}{PSDdir \cdot [(LED - \text{Rotate} \cdot (IRISpos + \text{Translate})) \times (\text{Rotate} \cdot IRISdir)]}$$

3. <u>PSD movable</u>

$$\lambda = \frac{(LED - \text{Rotate} \cdot (PSDpos + \text{Translate})) \cdot [(LED - IRISpos) \times IRISdir]}{(\text{Rotate} \cdot PSDdir) \cdot [(LED - IRISpos) \times IRISdir]}$$

The vector Translate indicates the displacement of the movable optical element. The matrix Rotate describes the rotation of the movable optical element about the co-ordinate origin (e.g. with the roll, pitch, yaw angles). In the resting position, the vector Translate is 0 and the matrix Rotate equals the identity matrix.

Calculation of a Translatory Movement

Figure 4:
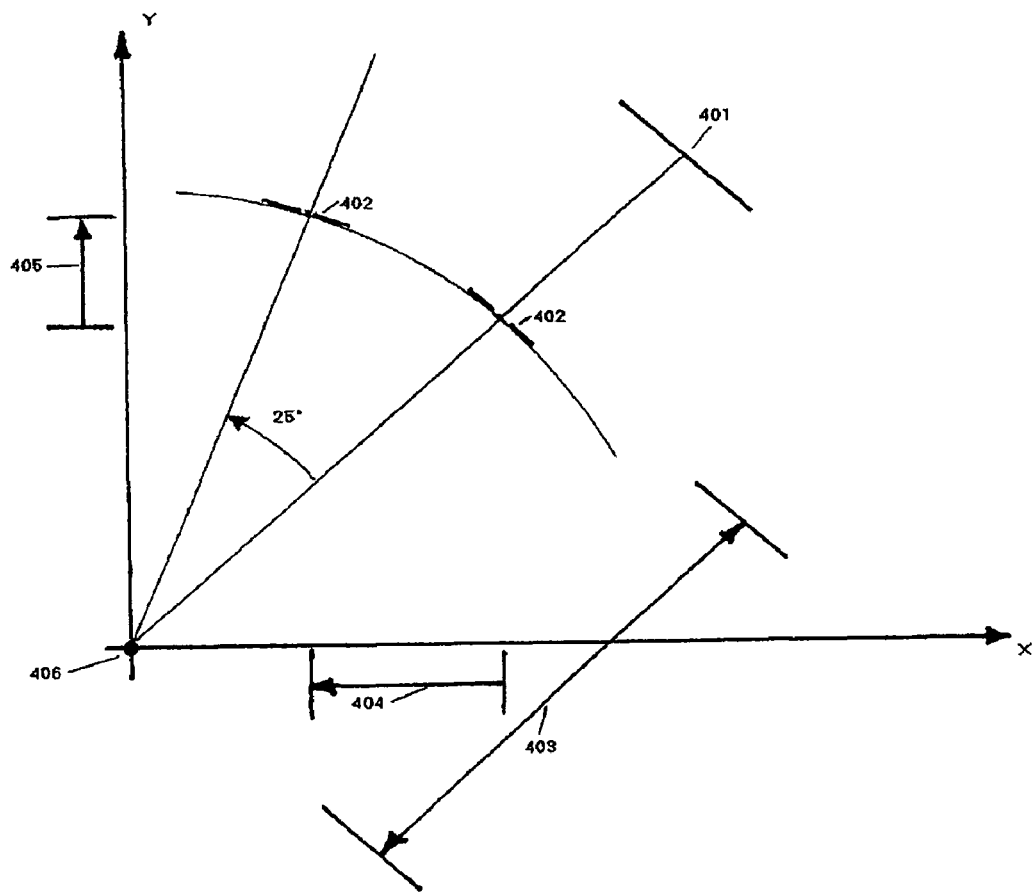
FIG. 4 shows a graphic representation of the calculation of a translatory movement of the diaphragm.

The above equations are further decomposed. The rotational portion is transferred to the translatory portion. A rotational movement can be captured by the measuring cell only because the rotation also causes a displacement, because of a lever. FIG. 4 shows an example in which a diaphragm 402 is rotated. The rotation becomes measurable only because of the distance 403 of to the diaphragm 402 from the centre of rotation 406 (where the LED is in the example). The measuring cell therefore captures the displacements X 404 and Y 405. The simultaneous rotation of the diaphragm 402 remains ineffective or negligible. In the case of the arrangements presented here, the magnitude of the rotation is low and limited to a few degrees. The translation (Translate) is thus the dominating factor.

The rotation is "transferred" to the Translate vector, and then also includes the translatory movement which occurs because of the rotation of the movable portion. This translatory portion can occur only if the movable part is not in the centre of rotation. The actual rotation of the movable part is ignored. The simplification of the portion Rotate*Translate≈Translate is applied.

The relative translatory movement of the movable part of the measuring cell is newly specified, and is thus:

Translate→Rotate·<movableportion>−
<movableportion>+Translate

Subject to the condition:

0=IRIS*dir*(LED*pos*×PSD*pos*−IRIS*pos*×PSD*pos*+
IRIS*pos*×LED*pos*)

$\lambda$=0 applies to the condition of no deflection (Translation=Rotation=$(0\ 0\ 0)^T$). The following simplifications result for the above equations (E=identity matrix):

1. <u>LED movable</u>: Translate → Translate + (Rotate − E)LED $$\lambda = \frac{\text{Translate}[(PSDpos - IRISpos) \times IRISdir]}{PSDdir \cdot ([LED - IRISpos] \times IRISdir) + \text{Translate}(IRISdir \times PSDdir)}$$

2. <u>Diaphragm movable</u>: Translate → Translate + (Rotate − E)IRISpos $$\lambda = \frac{\text{Translate}[(LED - PSDpos) \times IRISdir]}{(LED - IRISpos)(IRISdir \times PSDdir)) - \text{Translate}(IRISdir \times PSDdir)}$$

3. <u>PSD movable</u>: Translate → Translate + (Rotate − E)PSDpos $$\lambda = \frac{-\text{Translate}((LED - IRISpos) \times IRISdir)}{PSDdir \cdot ((LED - IRISpos) \times IRISdir)}$$

Changes with No Functional Effect on the Measuring Cell

The above equations describe the structure of a measuring cell quite generally. Because of the geometrical arrangement, it can be seen that parameters in the measuring cell can be changed with no change to the functioning of the measuring cell. Particular changes to one or more parameters of the measuring cell are thus insignificant for the actual function. The result is an additional "margin" for the arrangement of the measuring cell, resulting in a changed geometrical structure, but no effect on the function of the measuring cell.

Figure 5A:
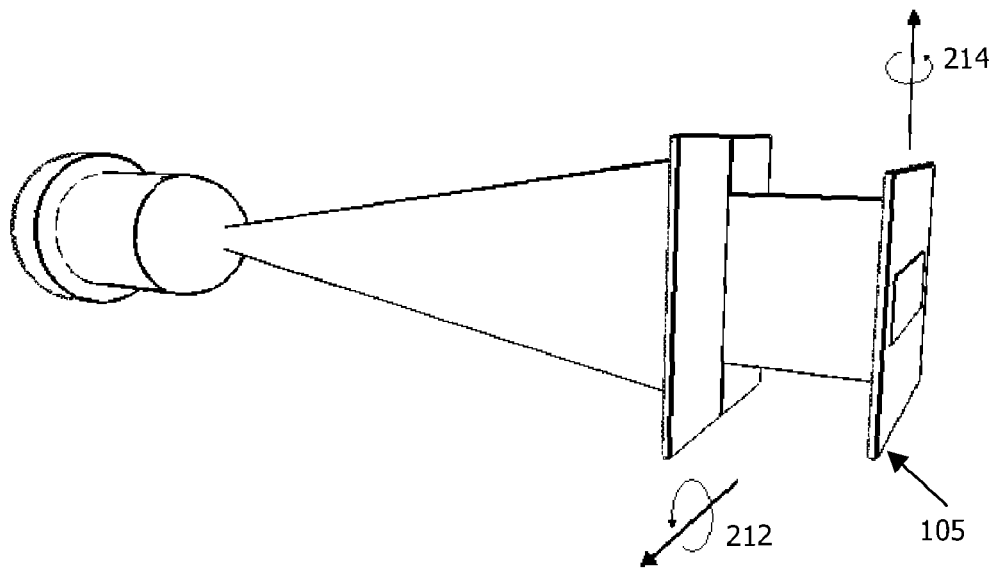
FIGS. 5a-5c show possible changes of the parameters of the measuring cell without functional effect.

In FIG. 5a, it can be seen that rotation of the PSD 105 by the vector PSDdir 212, or rotation by the vector LEDdir×PSDdir 214, and/or displacement along the vector LEDdir×PSDdir 214 have no effect as long as light still falls on the PSD 105. If a real PSD 105 prevents light falling, e.g. at a rotation of 90°, obviously the measuring cell no longer functions. Until this situation occurs, all rotations of the PSD 105 have no functional effect on the measuring cell.

Figure 5B:
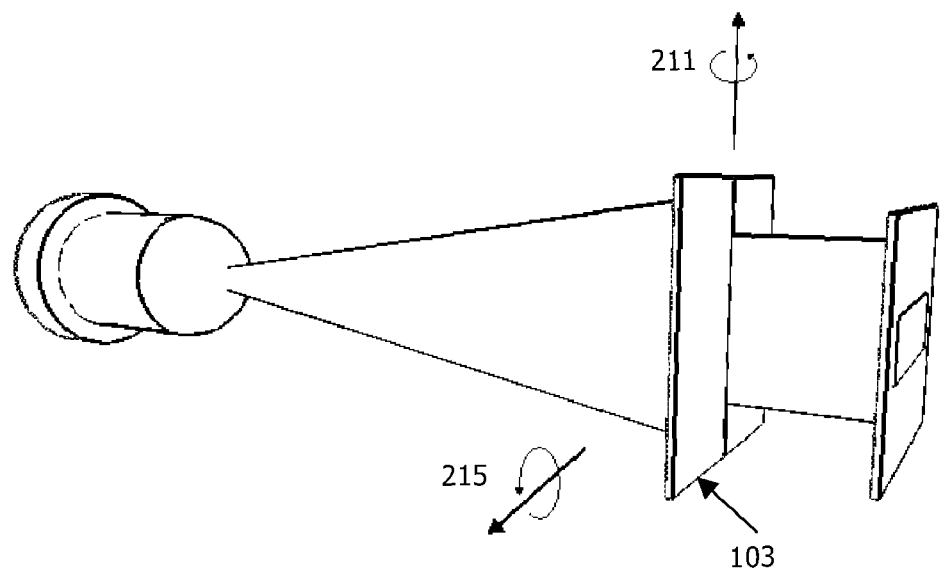

In FIG. 5b, it can be seen that something similar applies to the diaphragm 103. Rotation of the diaphragm 103 about the vector IRISdir 211, and/or displacement of the diaphragm along the vector IRISdir 211, or rotation about the vector IRISdir×LEDdir 215 have no effect on the measuring cell, as long as light can shine through the slot of the diaphragm 103.

Figure 5C:
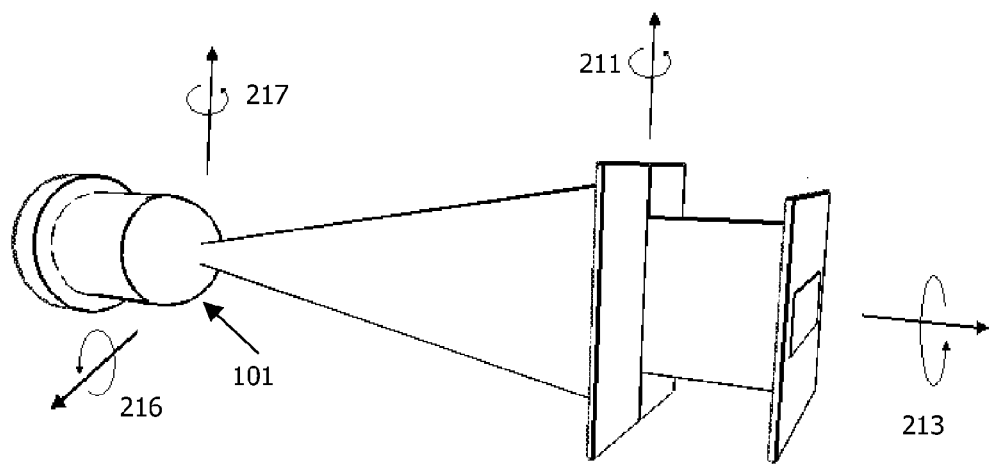

In FIG. 5c, it is demonstrated that the LED 101 can be arbitrarily rotated about the vector LEDdir 213. Even rotation about the vectors ⊥LEDdir 1 216, and ⊥LEDdir 2 217 which are perpendicular to it or displacement along the IRISdir 211 vector is possible with no functional effect on the measuring cell, as long as the light cone of the LED 101 covers the whole working range.

Rotating the Light Plane about the LEDdir Vector

Figure 6A:
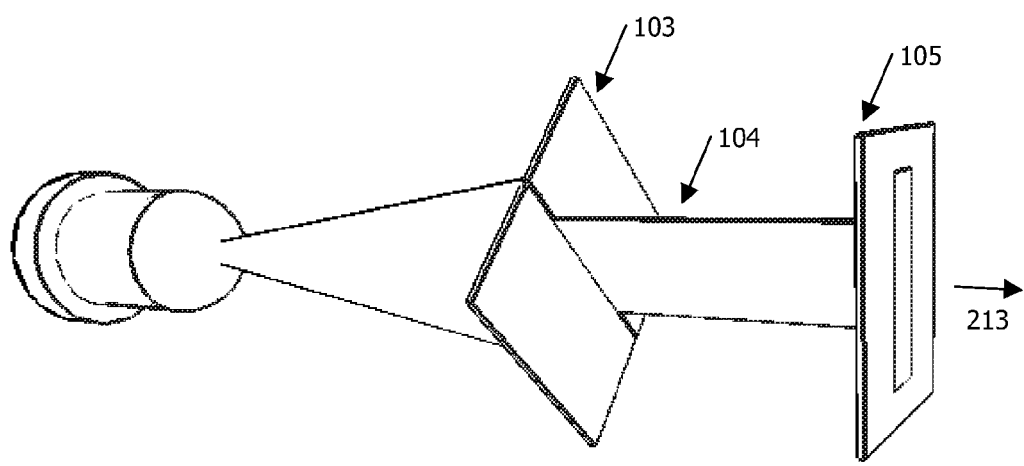
FIGS. 6a, 6b show a measuring cell of an opto-electronic arrangement according to the invention, with rotation of the diaphragm about the vector LEDdir.
Figure 6B:
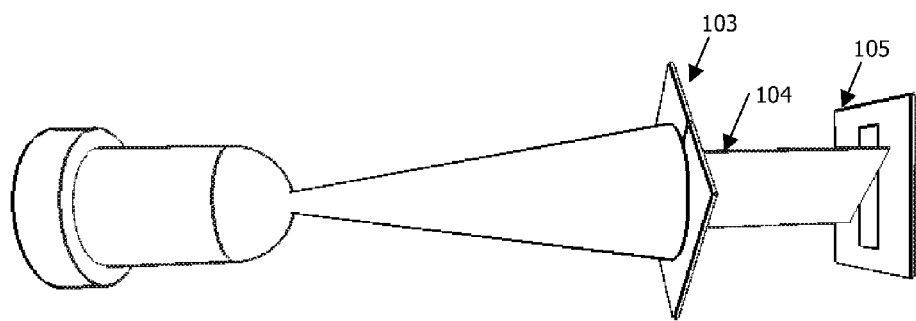

There are other changes to the arrangement of the measuring cell which affect its function. In these cases, the usual perpendicular or quasi-perpendicular arrangement is abandoned. The result of rotating the diaphragm 103 about the LEDdir 213 vector is that the light plane 104 strikes the PSD 105 only in a perpendicular or quasi-perpendicular direction. FIGS. 6a and 6b show such an arrangement in which the diaphragm 103 has been rotated by 45°. In FIG. 6a, the rotation of the slotted diaphragm 103 in relation to the PSD 105 can be seen. FIG. 6b shows how the light plane 104 falls on the PSD 105 in this case.

Figure 7:
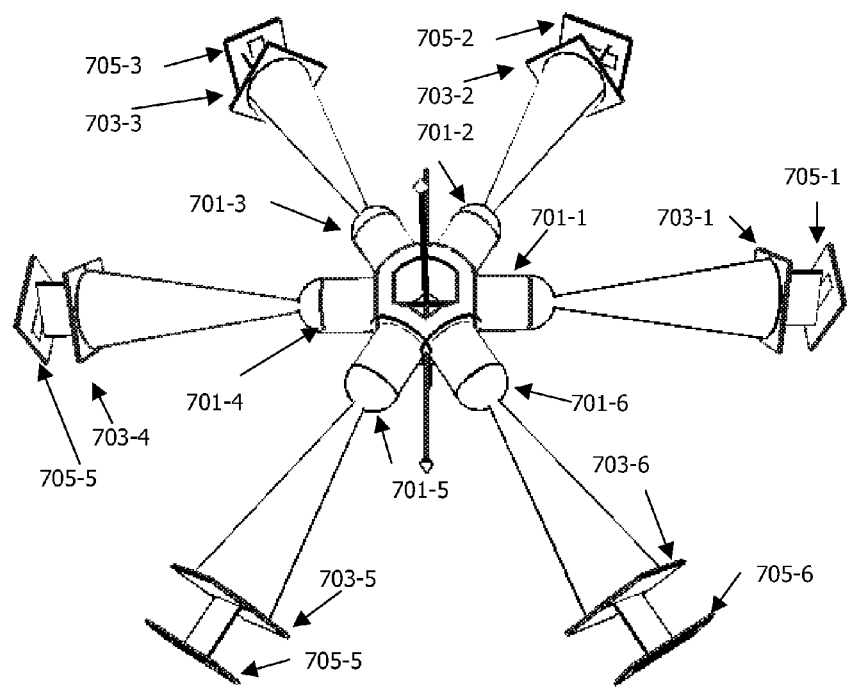
FIG. 7 shows an opto-electronic arrangement according to the invention, with six measuring cells

In FIG. 7 (movable diaphragm), a complete sensor arrangement, in which each diaphragm 703-1, . . . , 703-6 is rotated by 45°, is shown. LED 701-1, . . . , 701-6 and PSD 705-1, . . . , 705-6 are in fixed positions. In Table 6a, the parameters of all 6 measuring cells are listed. The parameter data is ordered in the sequence x, y and z with reference to the Cartesian coordinate system. The parameters $$LED, IRISpos, PSDpos = \begin{pmatrix} x \\ y \\ z \end{pmatrix}$$

should be understood as points of the individual optical elements, and the parameters $$IRISdir, PSDdir = \begin{pmatrix} x \\ y \\ z \end{pmatrix}$$

are the direction vectors of the measuring to cell, with the property |IRISdir|=|PSDdir|=1.

TABLE 6a

|  | 1 | 2 | 3 | 4 | 5 | 6 |
|---|---|---|---|---|---|---|
| LED | +6.000 | +3.000 | −3.000 | −6.000 | −3.000 | +3.000 |
|  | +0.000 | +0.000 | +0.000 | +0.000 | +0.000 | +0.000 |
|  | +0.000 | +5.196 | +5.196 | +0.000 | −5.196 | −5.196 |
| PSDpos | +23.000 | +11.500 | −11.500 | −23.000 | −11.500 | +11.500 |
|  | +0.000 | +0.000 | +0.000 | +0.000 | +0.000 | +0.000 |
|  | +0.000 | +19.919 | +19.919 | +0.000 | −19.919 | −19.919 |
| PSDdir | +0.000 | −0.866 | +0.000 | +0.000 | +0.000 | +0.866 |
|  | +1.000 | +0.000 | +1.000 | +1.000 | +1.000 | +0.000 |
|  | +0.000 | +0.500 | +0.000 | −1.000 | +0.000 | +0.500 |
| IRISpos | +20.000 | +10.000 | −10.000 | −20.000 | −10.000 | +10.000 |
|  | +0.000 | +0.000 | +0.000 | +0.000 | +0.000 | +0.000 |
|  | +0.000 | +17.321 | +17.321 | +0.000 | −17.321 | −17.321 |
| IRISdir | +0.000 | −0.612 | −0.612 | +0.000 | +0.612 | +0.612 |
|  | −0.707 | +0.707 | −0.707 | +0.707 | −0.707 | +0.707 |
|  | +0.707 | +0.354 | −0.354 | −0.707 | −0.354 | +0.354 |

TABLE 6b

Translation error 3.9%, rotation error 9.1%

|  | U1 | U2 | U3 | U4 | U5 | U6 |
|---|---|---|---|---|---|---|
| X | +0.0002 | −0.2353 | −0.2329 | −0.0002 | +0.2357 | +0.2343 |
| Y | +0.1373 | −0.1404 | +0.1347 | −0.1372 | +0.1400 | −0.1336 |
| Z | +0.2731 | +0.1395 | −0.1373 | −0.2731 | −0.1390 | +0.1352 |
| A | −0.0048 | +0.6723 | −0.6649 | +0.0032 | +0.6768 | −0.6678 |
| B | −0.3924 | −0.3880 | −0.3893 | −0.3918 | −0.3960 | −0.3962 |
| C | +0.7902 | −0.4153 | −0.4091 | +0.7736 | −0.3645 | −0.3840 |

Rotating the Light Plane about the IRISdir Vector

Figure 8:
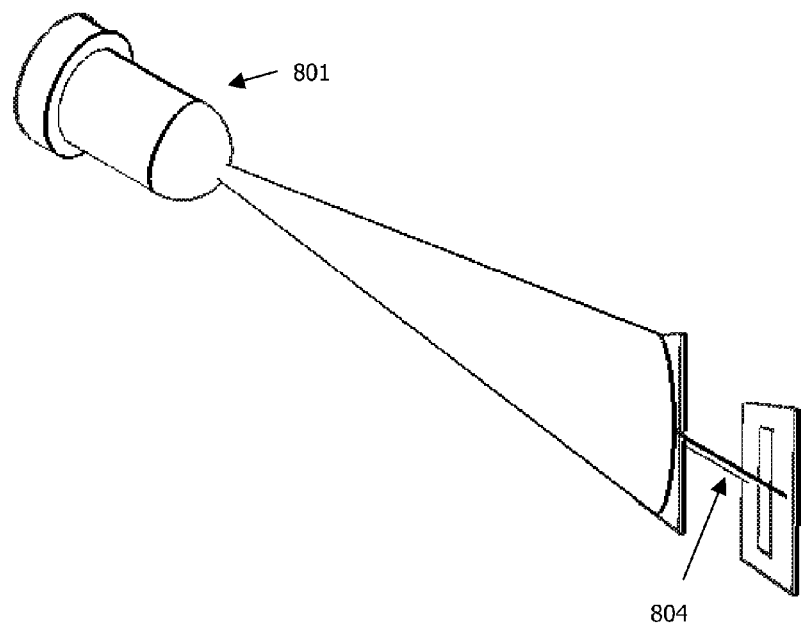
FIG. 8 shows a measuring cell of an opto-electronic arrangement according to the invention, with rotation of the diaphragm about the vector IRISdir.

A further change to the measuring cell is achieved by rotating the light plane 804 about the IRISdir vector. FIG. 8 shows a corresponding arrangement in which the LED 801 has been rotated away by 45°.

Figure 9:
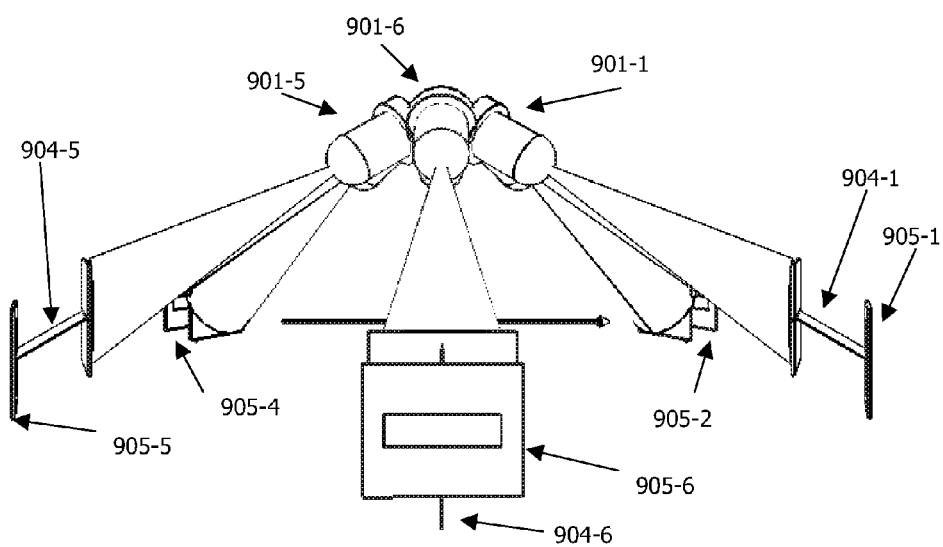
FIG. 9 shows an opto-electronic arrangement according to the invention, with six measuring cells according to FIG. 8.

In FIG. 9 (movable diaphragm), a complete sensor arrangement, in which all LEDs 901-1, . . . , 901-6 have been displaced out of the plane arrangement and the light planes 904-1, . . . , 904-6 fall diagonally on the PSDs 905-1, . . . , 905-6, is shown. This results in a change of the measuring cell in the case of the vertically arranged PSDs 905-1, 905-3 (hidden behind the light cone of LED 901-6 and thus not visible in FIG. 9), 905-5 only. The horizontally arranged PSDs 905-2, 905-4, 905-6 register no change to the measuring cell.

TABLE 8a

|        | 1        | 2        | 3        | 4        | 5        | 6        |
|--------|----------|----------|----------|----------|----------|----------|
| LED    | +6.0000  | +3.0000  | −3.0000  | −6.0000  | −3.0000  | +3.0000  |
|        | +10.0000 | +10.0000 | +10.0000 | +10.0000 | +10.0000 | +10.0000 |
|        | +0.0000  | +5.1962  | +5.1962  | +0.0000  | −5.1962  | −5.1962  |
| PSDpos | +23.0000 | +11.5000 | −11.5000 | −23.0000 | −11.5000 | +11.5000 |
|        | +0.0000  | +0.0000  | +0.0000  | +0.0000  | +0.0000  | +0.0000  |
|        | +0.0000  | +19.9186 | +19.9186 | +0.0000  | −19.9186 | −19.9186 |
| PSDdir | +0.0000  | −0.8660  | +0.0000  | +0.0000  | +0.0000  | +0.8660  |
|        | +1.0000  | +0.0000  | +1.0000  | +0.0000  | +1.0000  | +0.0000  |
|        | +0.0000  | +0.5000  | +0.0000  | −1.0000  | +0.0000  | +0.5000  |
| IRISpos| +20.0000 | +10.0000 | −10.0000 | −20.0000 | −10.0000 | +10.0000 |
|        | +1.8000  | +0.0000  | +1.8000  | +0.0000  | +1.8000  | +0.0000  |
|        | +0.0000  | +17.3205 | +17.3205 | +0.0000  | −17.3205 | −17.3205 |
| IRISdir| +0.0000  | +0.0000  | −0.8660  | +0.0000  | +0.8660  | +0.0000  |
|        | +0.0000  | +1.0000  | +0.0000  | +1.0000  | +0.0000  | +1.0000  |
|        | +1.0000  | +0.0000  | −0.5000  | +0.0000  | −0.5000  | +0.0000  |

TABLE 8b

Translation error 7.3%, rotation error 5.5%

|   | U1      | U2      | U3      | U4      | U5      | U6      |
|---|---------|---------|---------|---------|---------|---------|
| X | +0.0543 | −0.4413 | −0.0244 | −0.0051 | −0.0199 | +0.4424 |
| Y | +0.2791 | −0.0029 | +0.2712 | −0.0032 | +0.2726 | +0.0035 |
| Z | −0.0032 | +0.2743 | +0.0378 | −0.5214 | −0.0436 | +0.2441 |
| A | +0.0022 | +0.4840 | −1.3523 | −0.9147 | +1.3596 | +0.4358 |
| B | +0.0003 | −0.7801 | −0.0007 | −0.7851 | −0.0028 | −0.7883 |
| C | +1.5842 | +0.7692 | −0.7872 | −0.0151 | −0.7694 | −0.7668 |

Rules for Design of an Optical 3D Sensor

Group Formation

From the individual measuring cells, a complete 3D sensor (pan/zoom 3 degrees of freedom, or with 6 degrees of freedom) is to be built. The basic rule applies, that with N measuring cells at best an N-dimensional sensor can be built. The sensor is always seen in a Cartesian co-ordinate system which to corresponds to the right hand rule. The aim of the following group formation is to create rules using which groups of measuring cells (one or more measuring cells) can capture particular degrees of freedom in Cartesian space.

1-Group

With the 1-group, a single measuring cell is arranged so that approximately only one degree of freedom is captured. The measuring cell can actually capture no rotation, which can only be measured if it also causes a displacement (translation because of rotation, "carrousel movement").

Figure 10:
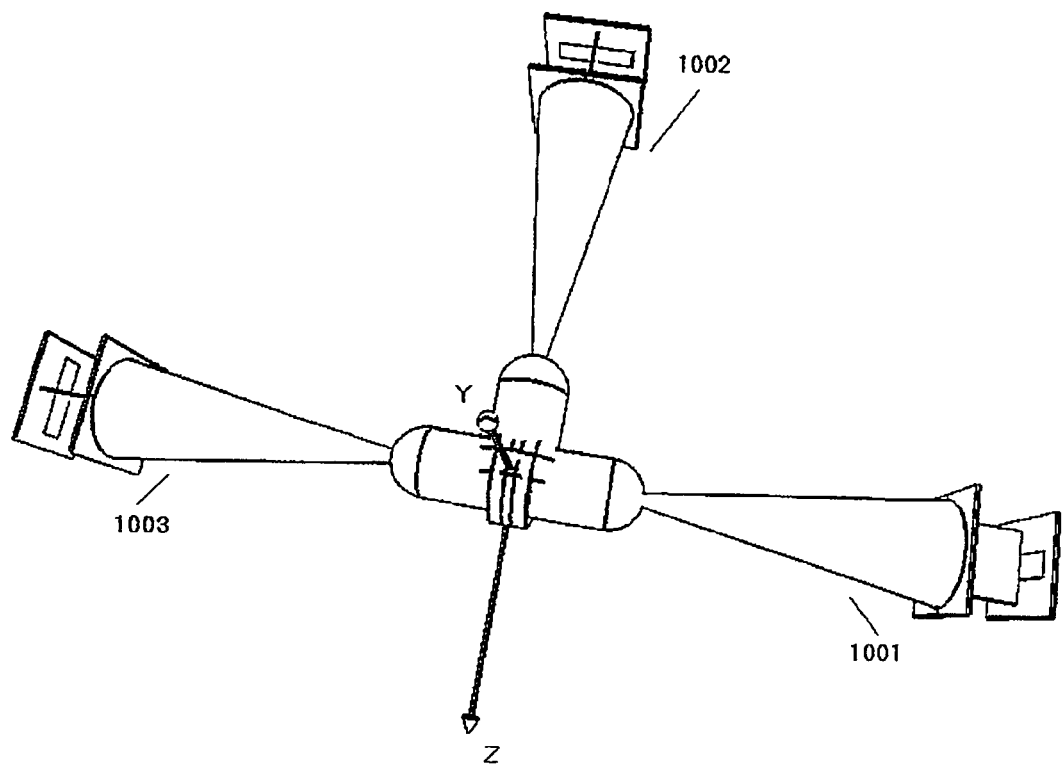
FIG. 10 shows an opto-electronic arrangement according to the invention, with three measuring cells, corresponding to three Cartesian axes.

Conversely, if the moved optical element (LED, diaphragm or PSD) is in or near the centre of rotation of the sensor, the measuring cell can only measure a translation. FIG. 10 (LED movable) shows such an arrangement for a pan/zoom sensor, which because of the arrangement can capture no or almost no rotation. The first measuring cell 1001 can capture only movements along the Y axis. Movements along the X axis are determined using the second measuring cell 1002, whereas the third measuring cell 1003 is responsible for measuring movement along the Z axis.

TABLE 10a

|        | 1        | 2        | 3        |
|--------|----------|----------|----------|
| LED    | +4.0000  | +0.0000  | −4.0000  |
|        | +0.0000  | +0.0000  | +0.0000  |
|        | +0.0000  | −4.0000  | +0.0000  |
| PSDpos | +21.0000 | +0.0000  | −21.0000 |
|        | +0.0000  | +0.0000  | +0.0000  |
|        | +0.0000  | −21.0000 | +0.0000  |

TABLE 10a-continued

|        | 1        | 2        | 3        |
|--------|----------|----------|----------|
| PSDdir | +0.0000  | +1.0000  | +0.0000  |
|        | +1.0000  | +0.0000  | +0.0000  |
|        | +0.0000  | +0.0000  | −1.0000  |
| IRISpos| +18.0000 | +0.0000  | −18.0000 |
|        | +0.0000  | +0.0000  | +0.0000  |
|        | +0.0000  | −18.0000 | +0.0000  |
| IRISdir| +0.0000  | +0.0000  | +0.0000  |
|        | +0.0000  | +1.0000  | +1.0000  |
|        | +1.0000  | +0.0000  | +0.0000  |

TABLE 10b

Translation error 7.2%

|   | U1      | U2      | U3      |
|---|---------|---------|---------|
| X | −0.0067 | −4.6780 | −0.0232 |
| Y | −4.6262 | +0.0065 | −0.0082 |
| Z | −0.0047 | −0.0176 | +4.6369 |

In the next step, the above 3D sensor (pan/zoom) is changed again. Instead of the LEDs in the centre of rotation, the PSDs are now placed there. Although it would be possible to place three PSDs in the centre of rotation, only a single PSD is used here, but the single PSD is used by all three measuring cells (multiple use). Obviously, this cannot happen simultaneously, because the PSD can detect only one intersection point of a light plane. Three intersection points simultaneously result in an arithmetic mean which cannot usefully be processed further. However, it is possible to interrogate the measuring cells in succession, to switch the LEDs on at staggered times (without overlap), and to determine the intersection points on the PSD in succession.

Figure 11A:
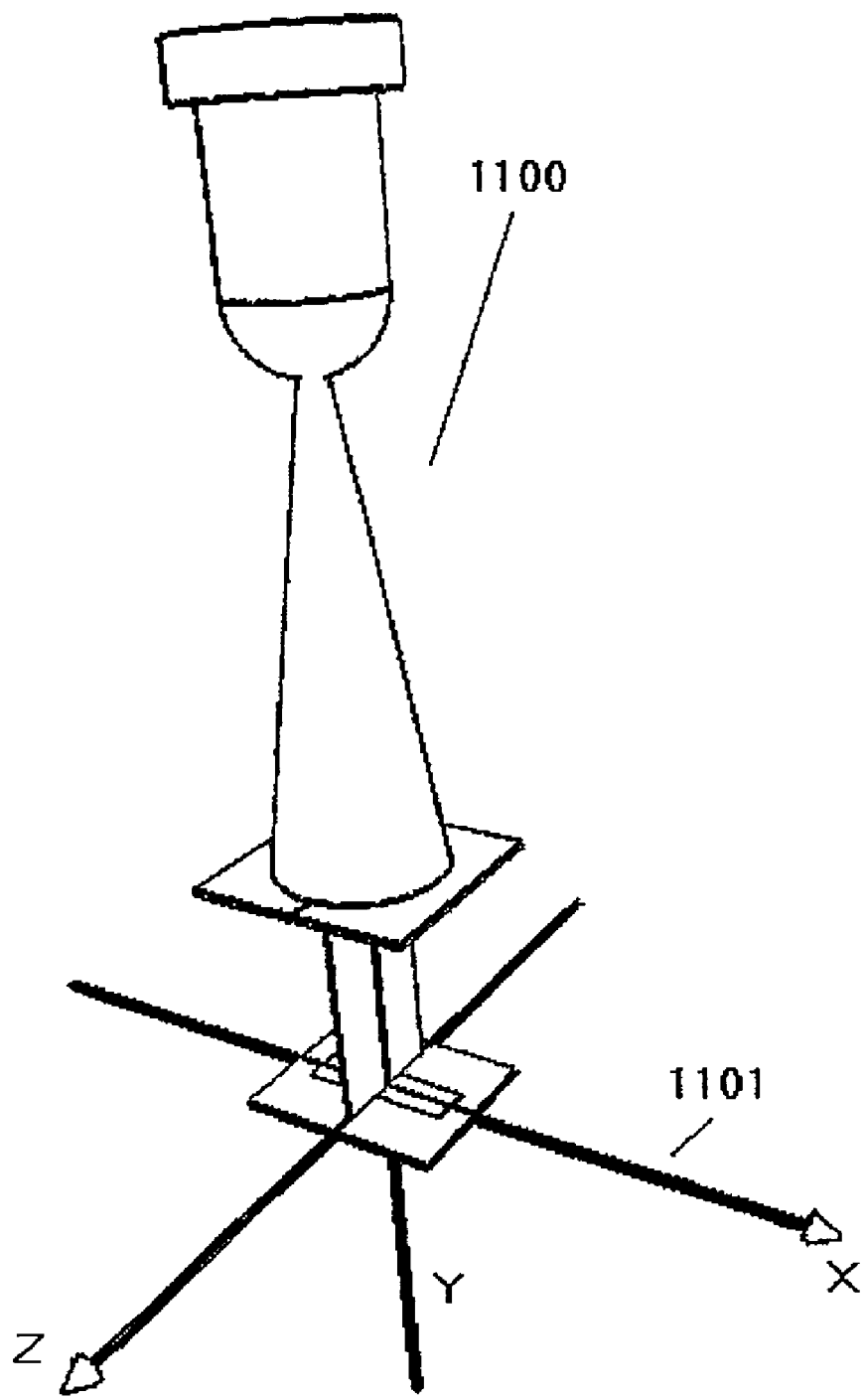
FIGS. 11a-11c show the structure of measuring cells of an opto-electronic arrangement according to the invention, multiple measuring cells being combined with each other, i.e. the measuring cells have a common position-sensitive detector.

In the first step, a first 1-group is formed. Using it, the movement along a principal axis is determined (here along the X axis). FIG. 11a shows the first measuring cell 1100.

Movement Vector

In FIG. 11a, the first movement vector 1101 for this measuring cell is also drawn in. It indicates what movement of the movable optical element the measuring cell can capture. All movements perpendicular to the movement vector cannot be captured. The movement vector is given by the vector product of IRISdir×LEDdir. It is thus independent of the orientation of the PSD (PSDdir). The orientation of the PSD is important for the working range of the measuring cell, but not for the measurable movement direction of the measuring cell.

2-Group

In a 2-group, two measuring cells are combined with each other, so that each measuring cell can capture up to two movements along the axes (X, Y or Z). It must be possible to distinguish the two movements through the combination of the two measuring cells. This can be read off on the basis of the appropriate movement vectors. The movement vectors must not be equal BEW1≠BEW2, or expressed otherwise the volume of the tetrahedron (cross-product) which is stretched out by the movement vectors should be as great as possible (sufficient condition).

$$|BEW1 \times BEW2| = MAX > 0$$

Figure 11B:
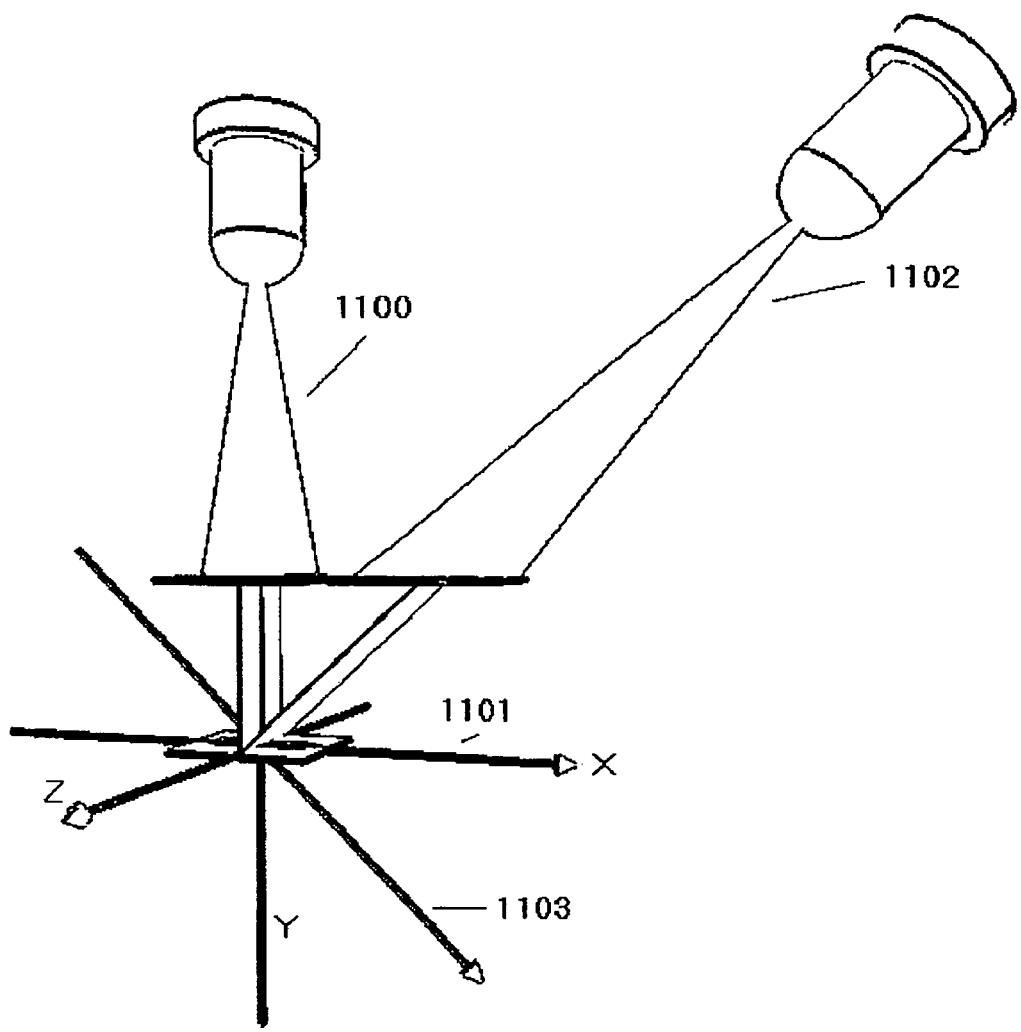

For the 2-group, the first measuring cell 1100 is combined with another measuring cell 1102. The second measuring cell 1102 is attached laterally, so that the light plane strikes the PSD at 45°. The second movement vector 1103 of the second measuring cell 1102 is arranged in the X/Y plane. It is thus able to capture the up and down movements along the Y axis as well as the movements along the X axis. The two measuring cells 1100, 1102 together form a 2-group, since each measuring cell can capture up to 2 degrees of freedom and the individual degrees of freedom can be uniquely deduced from the combination of the two captured movements. This relationship can be seen again later in the calibration matrix of the complete sensor (pan/zoom). The requirements for a 2-group do not make it necessary that a measuring cell captures only one movement direction (e.g. here along the X axis). A 2-group would also be given if the first measuring cell was arranged as the mirror image of the second measuring cell. Such a combination is shown in FIG. 11*b*.

Figure 11C:
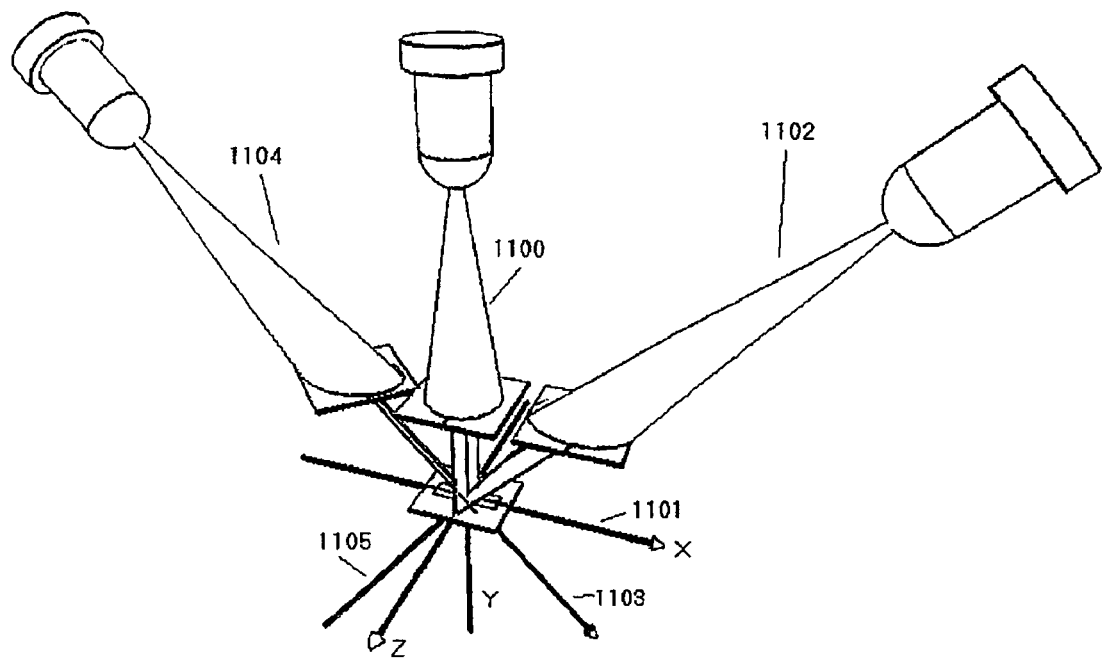

The third measuring cell 1104 must now capture at least the movement along the Z axis. A 1-group could achieve this. However, it can no longer be used here, since the PSD is already positioned along the X axis. A movement in the Z axis can be captured on the PSD only by a light plane which is rotated in the X/Z plane. This results in an arrangement of the third measuring cell 1104 in which the LED is displaced (e.g. along the Z axis) and the light plane falls on the PSD as desired through a rotated diaphragm. FIG. 11*c* (PSD movable) shows a possible arrangement with the third measuring cell 1104 and the third movement vector 1105.

TABLE 11a

|        | 1       | 2       | 3        |
|--------|---------|---------|----------|
| LED    | +0.0000 | +18.0000 | −18.0000 |
|        | +18.0000 | +18.0000 | +18.0000 |
|        | +0.0000 | +0.0000 | +0.0000 |
| PSDpos | +0.0000 | +0.0000 | +0.0000 |
|        | +0.0000 | +0.0000 | +0.0000 |
|        | +0.0000 | +0.0000 | +0.0000 |
| PSDdir | +1.0000 | +1.0000 | +1.0000 |
|        | +0.0000 | +0.0000 | +0.0000 |
|        | +0.0000 | +0.0000 | +0.0000 |
| IRISpos | +0.0000 | +6.0000 | −6.0000 |
|        | +6.0000 | +6.0000 | +6.0000 |
|        | +0.0000 | +0.0000 | +0.0000 |
| IRISdir | +0.0000 | +0.0000 | +0.7071 |
|        | +0.0000 | +0.0000 | +0.0000 |
|        | +1.0000 | +1.0000 | +0.7071 |

TABLE 11b

| Translation error 4.2% | | | |
|---|---|---|---|
|   | U1 | U2 | U3 |
| X | −1 | 0 | 0 |
| Y | −1 | +1 | 0 |
| Z | −2 | +1 | +1 | to Table 11b shows the calibration matrix, which because of the group formation can be very easily interpreted. To determine the movement along the X axis, only the first measuring cell 1100 is responsible. To determine this movement, only U1 is required. The voltage U2 (second measuring cell 1102) captures the movement along the X axis in a similar way to the first measuring cell 1100. The difference between the U2 and U1 voltages eliminates the X movement, and only the Y movement is left, and is captured only by the second measuring cell 1102. The third measuring cell 1104 actually represents a 3-group, because it can measure translatory movements along all axes. By using the 2-group which is formed with the first two measuring cells 1100, 1102, the already known movements along the X and Y axes can be eliminated. The factor for U1 eliminates the movement along the X axis for the first and second measuring cells 1100, 1102. Additionally, with the factor for U2, the movement along the Y axis is computationally removed from the third measuring cell 1104. Through the calibration matrix in the third row, only the movement along the Z axis is left, and is measured only by the third measuring cell 1104.

Figure 12A:
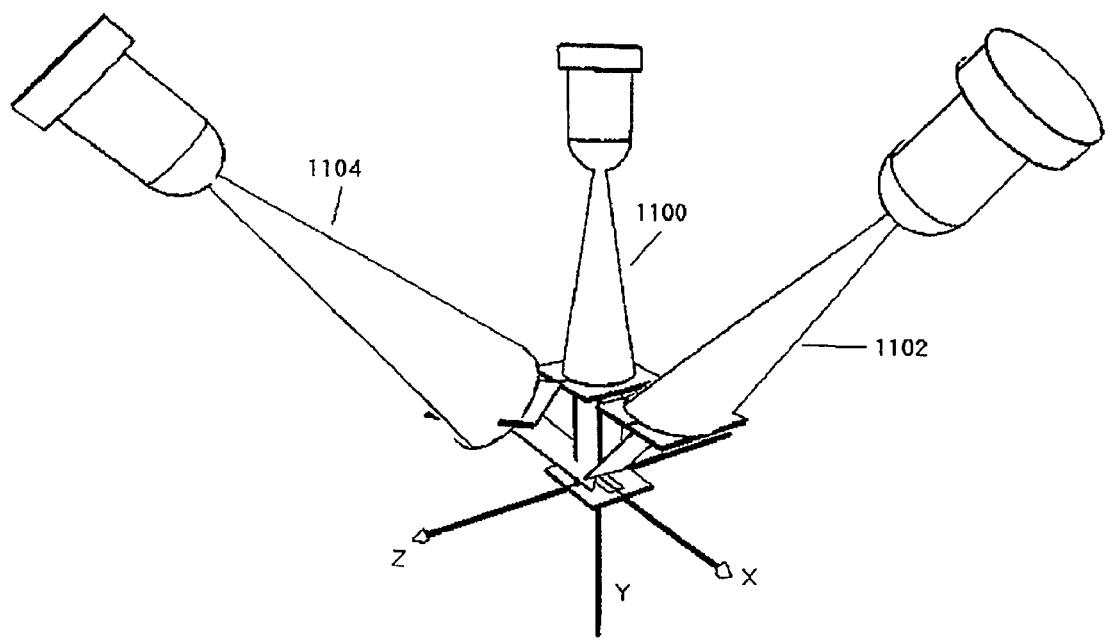
FIGS. 12a, 12b show a variation of the opto-electronic arrangement according to FIG. 11c.
Figure 12B:
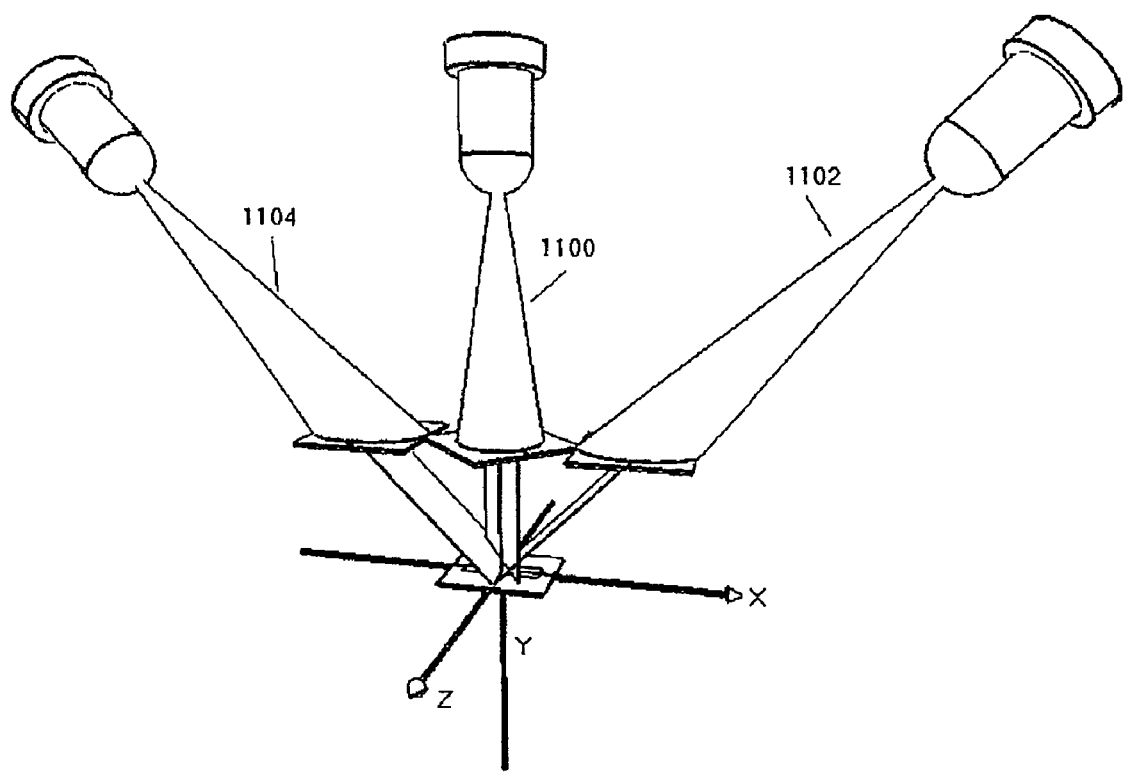

Two further variations are shown in FIGS. 12*a* and 12*b*. They were designed using the same methods as the pan/zoom sensor in FIG. 11*c*. They show how, with simple changes, different but equivalent or advantageous sensors can be developed.

In FIG. 12*a* (PSD movable), the third measuring cell 1104 has been displaced along the Z axis and not along the X axis as in the case of the sensor of FIG. 11*c*. In FIG. 12*b* (PSD movable), the symmetrically arranged first and second measuring cells 1100, 1102 form a 2-group. However, a symmetrical arrangement is not absolutely necessary for group formation. Instead, its purpose is to obtain a simpler calibration matrix, and to construct the working range of the complete sensor symmetrically. The third measuring cell 1104 forms a further 2-group with the first 2-group (first and second measuring cells 1100, 1102), since the measuring cell cannot capture the movement along the Y axis.

TABLE 12a

| Translation error 4.2% | | | |
|---|---|---|---|
|   | 1 | 2 | 3 |
| LED    | +0.0000 | +18.0000 | +0.0000 |
|        | +18.0000 | +18.0000 | +18.0000 |
|        | +0.0000 | +0.0000 | +18.0000 |
| PSDpos | +0.0000 | +0.0000 | +0.0000 |
|        | +0.0000 | +0.0000 | +0.0000 |
|        | +0.0000 | +0.0000 | +0.0000 |
| PSDdir | +1.0000 | +1.0000 | +1.0000 |
|        | +0.0000 | +0.0000 | +0.0000 |
|        | +0.0000 | +0.0000 | +0.0000 |
| IRISpos | +0.0000 | +6.0000 | +0.0000 |
|        | +6.0000 | +6.0000 | +6.0000 |
|        | +0.0000 | +0.0000 | +6.0000 |
| IRISdir | +0.0000 | +0.0000 | +0.7071 |
|        | +0.0000 | +0.0000 | +0.0000 |
|        | +1.0000 | +1.0000 | +0.7071 |

TABLE 12a-continued

| | Translation error 4.2% | | |
|---|---|---|---|
| | U1 | U2 | U3 |
| X | −1 | 0 | 0 |
| Y | −1 | +1 | 0 |
| Z | −2 | +1 | +1 |

TABLE 12b

| | U1 | U2 | U3 |
|---|---|---|---|
| X | −1 | 0 | 0 |
| Y | −1 | +1 | 0 |
| Z | −2 | +1 | +1 |

Translation error 4.2%

TABLE 12c

| | 1 | 2 | 3 |
|---|---|---|---|
| LEDpos | −18.0000 | +18.0000 | +0.0000 |
| | +18.0000 | +18.0000 | +18.0000 |
| | +0.0000 | +0.0000 | +0.0000 |
| PSDpos | +0.0000 | +0.0000 | +0.0000 |
| | +0.0000 | +0.0000 | +0.0000 |
| | +0.0000 | +0.0000 | +0.0000 |
| PSDdir | +1.0000 | +1.0000 | +1.0000 |
| | +0.0000 | +0.0000 | +0.0000 |
| | +0.0000 | +0.0000 | +0.0000 |
| IRISpos | −6.0000 | +6.0000 | +0.0000 |
| | +6.0000 | +6.0000 | +6.0000 |
| | +0.0000 | +0.0000 | +0.0000 |
| IRISdir | +0.0000 | +0.0000 | +0.7071 |
| | +0.0000 | +0.0000 | +0.0000 |
| | +1.0000 | +1.0000 | +0.7071 |

TABLE 12b

| | Translation error 3.3% | | |
|---|---|---|---|
| | 1 | 2 | 3 |
| LED | −18.0000 | +18.0000 | +0.0000 |
| | +18.0000 | +18.0000 | +18.0000 |
| | +0.0000 | +0.0000 | +0.0000 |
| PSDpos | +0.0000 | +0.0000 | +0.0000 |
| | +0.0000 | +0.0000 | +0.0000 |
| | +0.0000 | +0.0000 | +0.0000 |
| PSDdir | +1.0000 | +1.0000 | +1.0000 |
| | +0.0000 | +0.0000 | +0.0000 |
| | +0.0000 | +0.0000 | +0.0000 |

TABLE 12b-continued

| | Translation error 3.3% | | |
|---|---|---|---|
| IRISpos | −6.0000 | +6.0000 | +0.0000 |
| | +6.0000 | +6.0000 | +6.0000 |
| | +0.0000 | +0.0000 | +0.0000 |
| IRISdir | +0.0000 | +0.0000 | +0.7071 |
| | +0.0000 | +0.0000 | +0.0000 |
| | +1.0000 | +1.0000 | +0.7071 |
| | U1 | U2 | U3 |
| X | −0.5 | −0.5 | 0 |
| Y | −0.5 | +0.5 | 0 |
| Z | −0.5 | −0.5 | +1 |

The above examples show that numerous arrangements result in a pan/zoom sensor. For the basic functions, whether the diagonally incident light plane is at 45° or a different angle is not decisive. The angle of incidence affects the gained resolution and the working range of the movement to be captured. By placing the light plane diagonally (in two degrees of freedom, rotation about the LEDdir and IRISdir vectors), the measuring cell can also be used for "unfavourable" movements.

In the case of perpendicular or quasi-perpendicular incident light, these additional possibilities cannot be used.

Design of 3D Sensors with 6 Degrees of Freedom

Figure 13A:
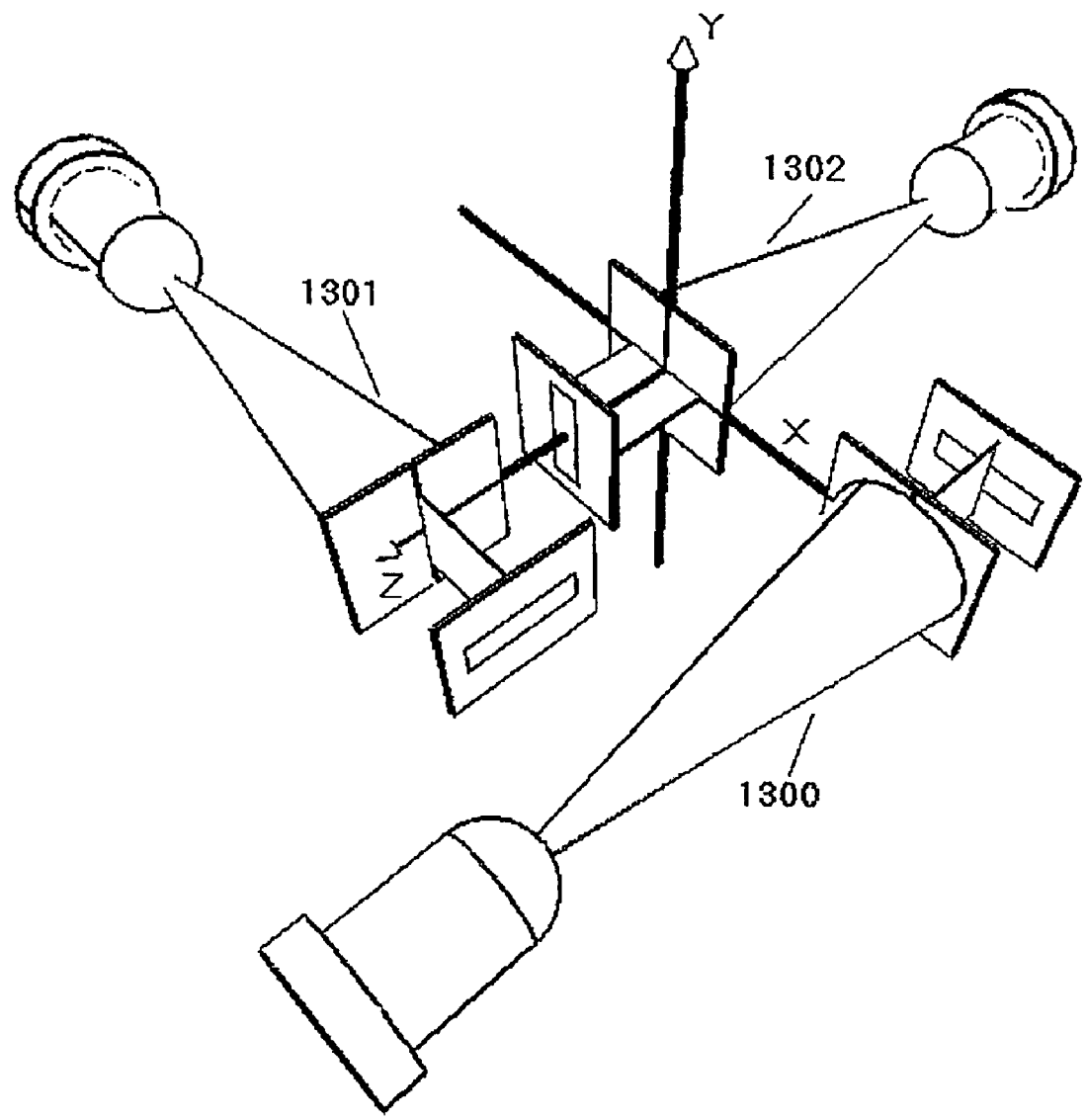
FIGS. 13a, 13b show the structure of an opto-electronic arrangement according to the invention, which is suitable for measuring six degrees of freedom.

In a similar way to the case of the pan/zoom sensor, a 3D sensor with 6 degrees of freedom is now constructed. The 1-groups are set first. In this example, the diaphragms will be the movable optical element. The diaphragms are positioned on the principal axes to form the 1-groups. In FIG. 13a, the first three measuring cells are positioned.

Figure 13B:
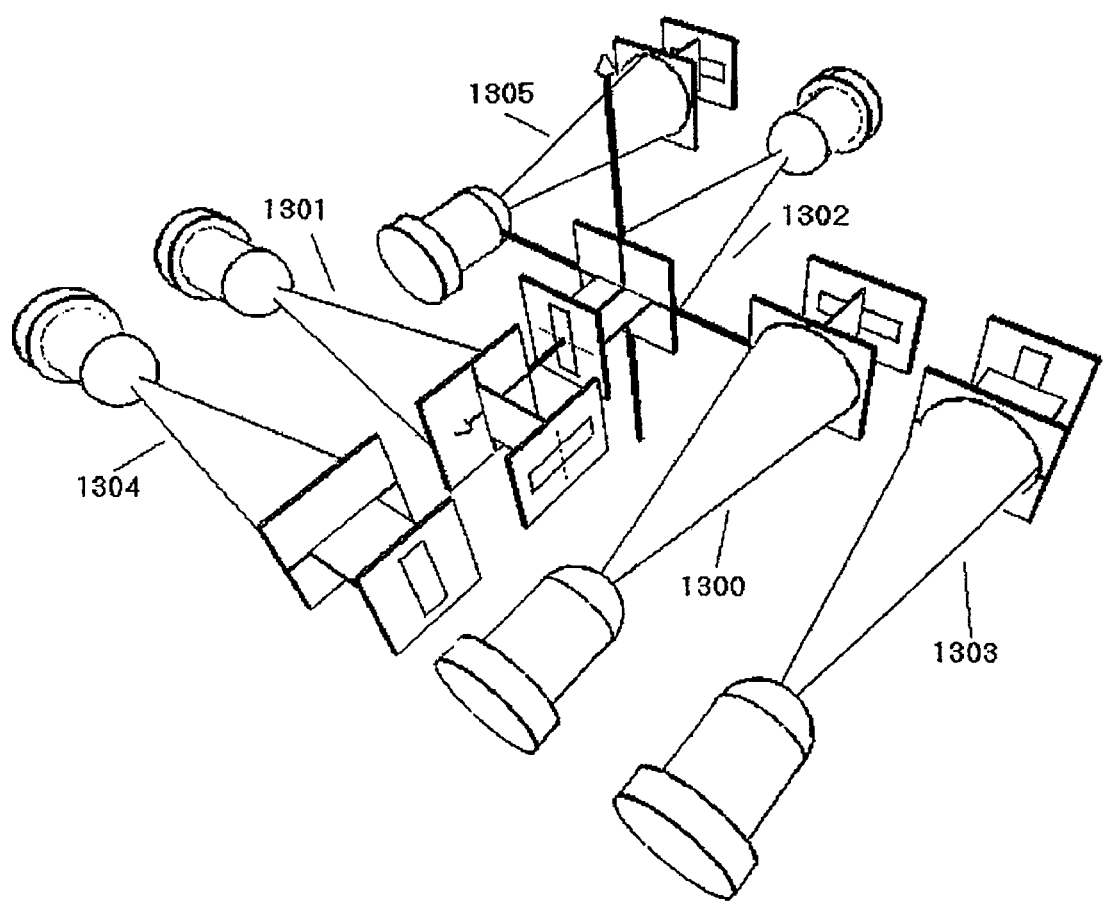

The diaphragm of the first measuring cell 1300 is positioned on the X axis. This measuring cell can therefore capture exclusively movements along the X axis. It is suggested as a partner for a 2-group because the movement along the X axis can be completely calculated from a 2-group. The second measuring cell 1301 is positioned similarly. It can measure only the movements along the Z axis. So that the third measuring cell 1302 also forms a 1-group, its diaphragm is placed in the co-ordinate origin. It can therefore capture only the movements along the Y axis. With these three measuring cells 1300, 1301, 1302, only the translatory movements are measured. Once each measuring cell is responsible for exactly one principal axis, it is only necessary to arrange the remaining three measuring cells in such a way that they can capture the rotational degrees of freedom. FIG. 13b (diaphragm movable) shows a possible arrangement of all six measuring cells. By forming 1-groups, it is enough to capture each of the remaining rotations by only one measuring cell.

TABLE 13a

| | 1 | 2 | 3 | 4 | 5 | 6 |
|---|---|---|---|---|---|---|
| LED | +9.0000 | −14.0000 | +0.0000 | +16.0000 | −14.0000 | −9.0000 |
| | +0.0000 | +0.0000 | +0.0000 | +0.0000 | +0.0000 | +0.0000 |
| | +14.0000 | +9.0000 | −14.0000 | +14.0000 | +16.0000 | +0.0000 |
| PSDpos | +9.0000 | +4.0000 | +0.0000 | +16.0000 | +4.0000 | −9.0000 |
| | +0.0000 | +0.0000 | +0.0000 | +0.0000 | +0.0000 | +0.0000 |
| | −4.0000 | +9.0000 | +4.0000 | −4.0000 | +16.0000 | −18.0000 |
| PSDdir | +1.0000 | +0.0000 | +0.0000 | +0.0000 | +0.0000 | +1.0000 |
| | +0.0000 | +0.0000 | +1.0000 | +1.0000 | +1.0000 | +0.0000 |
| | +0.0000 | +1.0000 | +0.0000 | +0.0000 | +0.0000 | +0.0000 |
| IRISpos | +9.0000 | +0.0000 | +0.0000 | +16.0000 | +0.0000 | −9.0000 |
| | +0.0000 | +0.0000 | +0.0000 | +0.0000 | +0.0000 | +0.0000 |
| | +0.0000 | +9.0000 | +0.0000 | +0.0000 | +16.0000 | −14.0000 |

TABLE 13a-continued

|         | 1       | 2       | 3       | 4       | 5       | 6       |
|---------|---------|---------|---------|---------|---------|---------|
| IRISdir | +0.0000 | +0.0000 | +1.0000 | +1.0000 | +0.0000 | +0.0000 |
|         | +1.0000 | +1.0000 | +0.0000 | +0.0000 | +0.0000 | +1.0000 |
|         | +0.0000 | +0.0000 | +0.0000 | +0.0000 | +1.0000 | +0.0000 |

The fourth measuring cell 1303 captures the rotation about the Z axis (C value) as well as the movement along the Y axis. Similarly, the fifth measuring cell 1304 captures the movement along the Y axis and the rotation about the X axis (A value). The remaining rotation about the Y axis is measured by the to sixth measuring cell 1305, which can also capture the movement along the X axis. The result is the following calibration matrix.

TABLE 13b

Translation error 4.9%, rotation error 13.6%

|   | U1      | U2      | U3      | U4      | U5      | U6      |
|---|---------|---------|---------|---------|---------|---------|
| X | +0.7578 | +0.0006 | +0.0105 | −0.0055 | −0.0025 | +0.0015 |
| Y | +0.0240 | −0.0009 | +0.7562 | +0.0108 | +0.0029 | −0.0040 |
| Z | +0.0235 | +0.7756 | −0.0105 | +0.0058 | +0.0032 | −0.0012 |
| A | +0.0265 | −0.0149 | +2.6868 | +0.0174 | −2.7359 | +0.0043 |
| B | +3.1990 | −0.0019 | +0.0349 | −0.0127 | −0.0083 | −3.1562 |
| C | −0.0907 | +0.0013 | −2.6267 | +2.6996 | −0.0233 | +0.0249 |

The calibration matrix shows the chosen arrangement very clearly. For instance, the movement along the X axis can be determined only by the first measuring cell 1300 (voltage U1), although the sixth measuring cell 1305 can also capture the movement along the X axis. Overall, the calibration matrix is very thinly populated. Table 13c shows the calibration matrix with very small values removed.

TABLE 13c

|   | U1      | U2      | U3      | U4      | U5      | U6      |
|---|---------|---------|---------|---------|---------|---------|
| X | +0.7578 |         |         |         |         |         |
| Y |         |         | +0.7562 |         |         |         |
| Z |         | +0.7756 |         |         |         |         |
| A |         |         | +2.6868 |         | −2.7359 |         |
| B | +3.1990 |         |         |         |         | −3.1562 |
| C |         |         | −2.6267 | +2.6996 |         |         |

The errors of the calibration matrix for translation and rotation occur because of the linearisation which is applied there. However, because of the chosen arrangement, the exact model can also be applied very easily.

2-Group

Figure 14A:
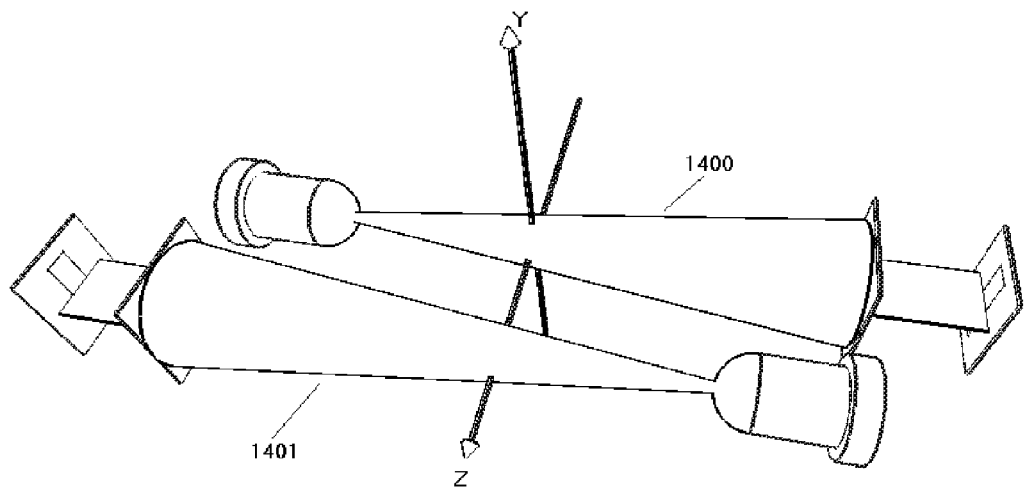
FIGS. 14a-14c show the structure of another opto-electronic arrangement according to the invention, which is suitable for measuring six degrees of freedom.

For the next arrangement, 2-groups are formed immediately. The measuring cells in a 2-group are arranged so that two degrees of freedom of a 2-group are captured. In this way, the movable optical element no longer has to be arranged at the origin or along the principal axis. FIG. 14*a* shows the first 2-group, which is responsible for measuring the movement along the Y axis and the rotation about the Z axis (C movement). The two measuring cells 1400, 1401 can capture the Y and C movements. For a single measuring cell, one movement cannot be distinguished from the other. The individual movements can only be unambiguously distinguished by combining the measuring cells 1400, 1401 (into a 2-group).

Because of the lateral displacement of the second measuring cell 1401 to the first measuring cell 1400, the second measuring cell 1401 can also capture rotations about the X axis (movement A). However, because of the short distance to the axis, this is not particularly pronounced.

Figure 14B:
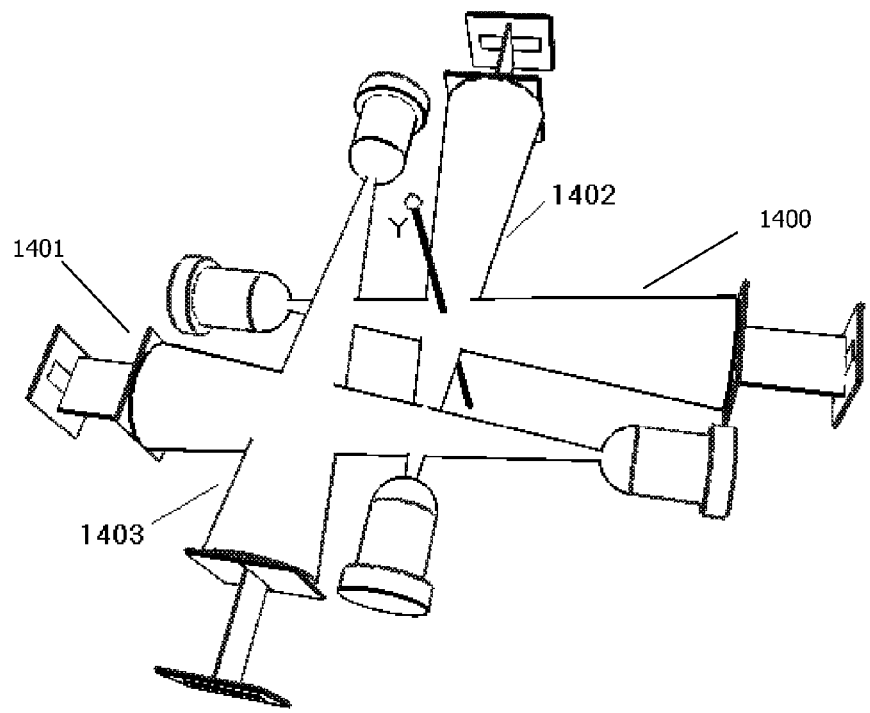

Another 2-group now captures two further degrees of freedom. It is positioned similarly to the first 2-group, but fitted rotated by 90°. The second 2-group is shown in FIG. 14*b*. The second 2-group comprises the third measuring cell 1402 and the fourth measuring cell 1403. The second 2-group can capture the movements along the X axis and the rotation about the Y axis (B movement).

Figure 14C:
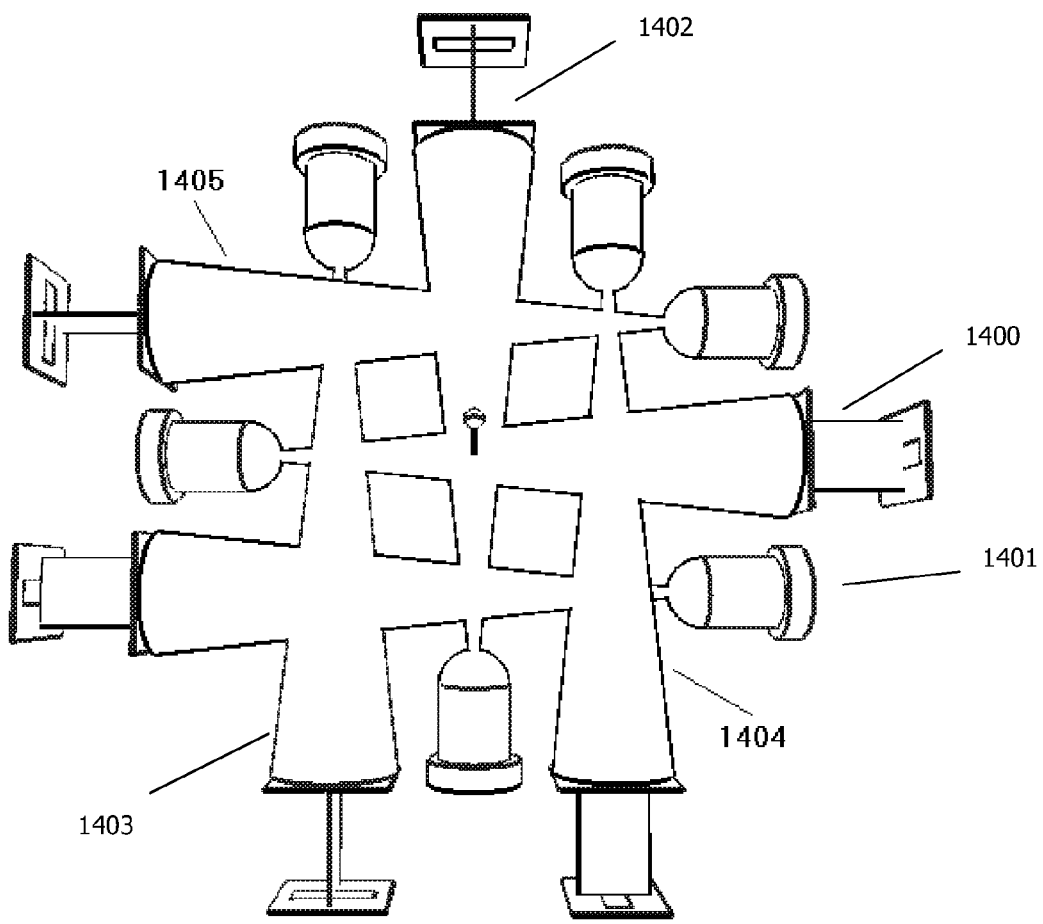

A 2-group which can capture the missing movements (Z and A) could be arranged along the Y axis. This could happen with the same arrangement as in the cases of the first two 2-groups. Since this would complicate the structure, the two remaining degrees of freedom are captured separately. Each measuring cell supplements the previously positioned 2-groups to form a 3-group. FIG. 14*c* (diaphragm movable) shows the whole arrangement.

TABLE 14a

|         | 1        | 2        | 3        | 4        | 5        | 6        |
|---------|----------|----------|----------|----------|----------|----------|
| LED     | −10.0000 | +10.0000 | +0.0000  | −6.0000  | +6.0000  | +10.0000 |
|         | +0.0000  | +0.0000  | +0.0000  | +0.0000  | +0.0000  | +0.0000  |
|         | +0.0000  | +6.0000  | +10.0000 | −10.0000 | −9.0000  | −6.0000  |
| PSDpos  | +19.0000 | −19.0000 | +0.0000  | −6.0000  | +6.0000  | −19.0000 |
|         | +0.0000  | +0.0000  | +0.0000  | +0.0000  | +0.0000  | +0.0000  |
|         | +0.0000  | +6.0000  | −19.0000 | +19.0000 | +19.0000 | −6.0000  |
| PSDdir  | +0.0000  | +0.0000  | +1.0000  | +1.0000  | +0.0000  | +0.0000  |
|         | +1.0000  | +1.0000  | +0.0000  | +0.0000  | +1.0000  | +0.0000  |
|         | +0.0000  | +0.0000  | +0.0000  | +0.0000  | +0.0000  | +1.0000  |
| IRISpos | +14.0000 | −14.0000 | +0.0000  | −6.0000  | +6.0000  | −14.0000 |
|         | +0.0000  | +0.0000  | +0.0000  | +0.0000  | +0.0000  | +0.0000  |
|         | +0.0000  | +6.0000  | −14.0000 | +14.0000 | +14.0000 | −6.0000  |
| IRISdir | +0.0000  | +0.0000  | +0.0000  | +0.0000  | +1.0000  | +0.0000  |
|         | +0.0000  | +0.0000  | +1.0000  | +1.0000  | +0.0000  | +1.0000  |
|         | +1.0000  | +1.0000  | +0.0000  | +0.0000  | +0.0000  | +0.0000  |

The fifth measuring cell 1404 captures the A and Y movements. It thus supplements the first 2-group (first and second measuring cells 1400, 1401—Y/C) to form a 3-group. The equivalent happens with the sixth measuring cell 1405, which to captures movements Z and B. The second 2-group (third and fourth measuring cell 1402, 1403—X/B) becomes a 3-group, and can measure the movements X, B and Z.

TABLE 14b

Translation error 3.5%, rotation error 6.9%

|   | U1 | U2 | U3 | U4 | U5 | U6 |
|---|---|---|---|---|---|---|
| X | +0.0009 | +0.0023 | +0.4112 | +0.4109 | +0.0006 | −0.0008 |
| Y | +0.5574 | +0.4707 | +0.0022 | +0.0018 | −0.1973 | +0.0001 |
| Z | −0.0022 | −0.0053 | +0.4000 | −0.4204 | −0.0008 | +0.8269 |
| A | +2.7614 | +1.1029 | −0.0142 | −0.0107 | −3.8144 | +0.0015 |
| B | +0.0036 | +0.0080 | −1.6638 | +1.7092 | −0.0022 | +0.0010 |
| C | +1.1318 | −1.9144 | +0.0175 | +0.0236 | +0.7913 | +0.0063 |

3-Group

Figure 15:
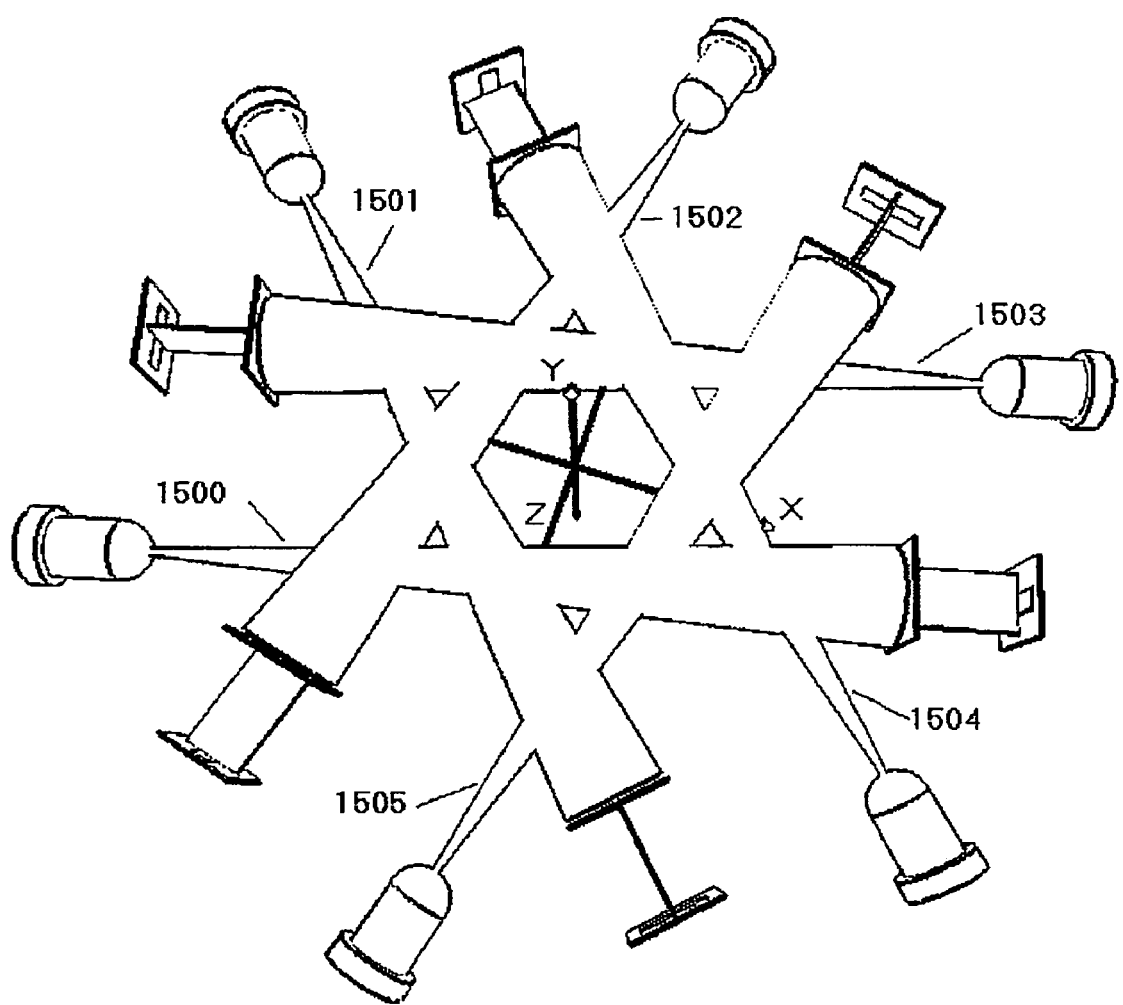
FIG. 15 shows an opto-electronic arrangement according to the invention, consisting of three pairs of parallel measuring cells.

In FIG. 15 (diaphragm movable), an arrangement consisting of two 3-groups is shown. The first 3-group consisting of a first measuring cell 1500, a third measuring cell 1502, and a fifth measuring cell 1504 measures the movements Y, A and B. The remaining movements X, Z and C are captured by a second measuring cell 1501, a fourth measuring cell 1503, and a sixth measuring cell 1505.

TABLE 15a

|   | 1 | 2 | 3 | 4 | 5 | 6 |
|---|---|---|---|---|---|---|
| LED | −19.9186 | −19.9186 | +0.0000 | +19.9186 | +19.9186 | =0.0000 |
|  | +0.0000 | +0.0000 | +0.0000 | +0.0000 | +0.0000 | +0.0000 |
|  | +11.5000 | −11.5000 | −23.0000 | −11.5000 | +11.5000 | +23.0000 |
| PSDpos | +23.0000 | +11.5000 | −11.5000 | −23.0000 | −11.5000 | +11.5000 |
|  | +0.0000 | +0.0000 | +0.0000 | +0.0000 | +0.0000 | +0.0000 |
|  | +0.0000 | +19.9186 | +19.9186 | +0.0000 | −19.9186 | −19.9186 |
| PSDdir | +0.0000 | +0.7071 | +0.0000 | +0.2588 | +0.0000 | −0.9659 |
|  | +1.0000 | +0.0000 | +1.0000 | +0.0000 | +1.0000 | +0.0000 |
|  | +0.0000 | −0.7071 | +0.0000 | +0.9659 | +0.0000 | −0.2588 |
| IRISpos | +17.4019 | +7.4019 | −10.0000 | −17.4019 | −7.4019 | +10.0000 |
|  | +0.0000 | +0.0000 | +0.0000 | +0.0000 | +0.0000 | +0.0000 |
|  | +1.5000 | +15.8205 | +14.3205 | −1.5000 | −15.8205 | −14.3205 |
| IRISdir | −0.2588 | +0.0000 | +0.9659 | +0.0000 | −0.7071 | +0.0000 |
|  | +0.0000 | +1.0000 | +0.0000 | +1.0000 | +0.0000 | +1.0000 |
|  | −0.9659 | +0.0000 | +0.2588 | +0.0000 | +0.7071 | +0.0000 |

TABLE 15b

Translation error 3.0%, rotation error 3.0%

|   | U1 | U2 | U3 | U4 | U5 | U6 |
|---|---|---|---|---|---|---|
| X | +0.0020 | +0.4049 | +0.0012 | +0.1488 | +0.0015 | −0.5530 |
| Y | +0.2901 | +0.0031 | +0.2901 | +0.0012 | +0.2895 | −0.0043 |
| Z | −0.0023 | −0.4104 | −0.0024 | +0.5591 | −0.0016 | −0.1487 |
| A | −0.1633 | −0.0101 | −1.5511 | −0.0062 | +1.7192 | +0.0122 |
| B | +0.0002 | +1.0107 | +0.0003 | +1.0110 | −0.0004 | +1.0111 |
| C | +1.8993 | +0.0007 | −1.0899 | +0.0039 | −0.7990 | +0.0007 |

Starting from the above arrangement, two measuring cells are now combined. The two LEDs throw the light onto the same PSD. In other words, the PSDs of the two measuring cells are in the to same place and have the same orientation. Thus one of the two PSDs is saved. The PSD is usually the most expensive optical element of the measuring cell.

Figure 16A:
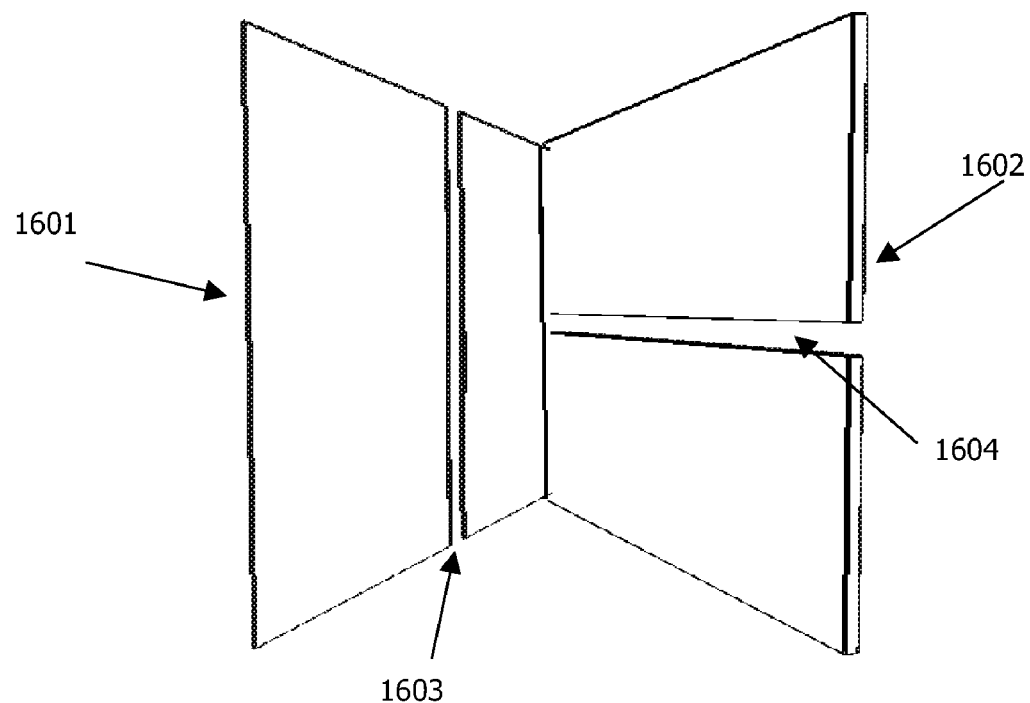
FIGS. 16a-16c show a pair of adjacent diaphragms for an opto-electronic arrangement according to the invention.
Figure 16B:
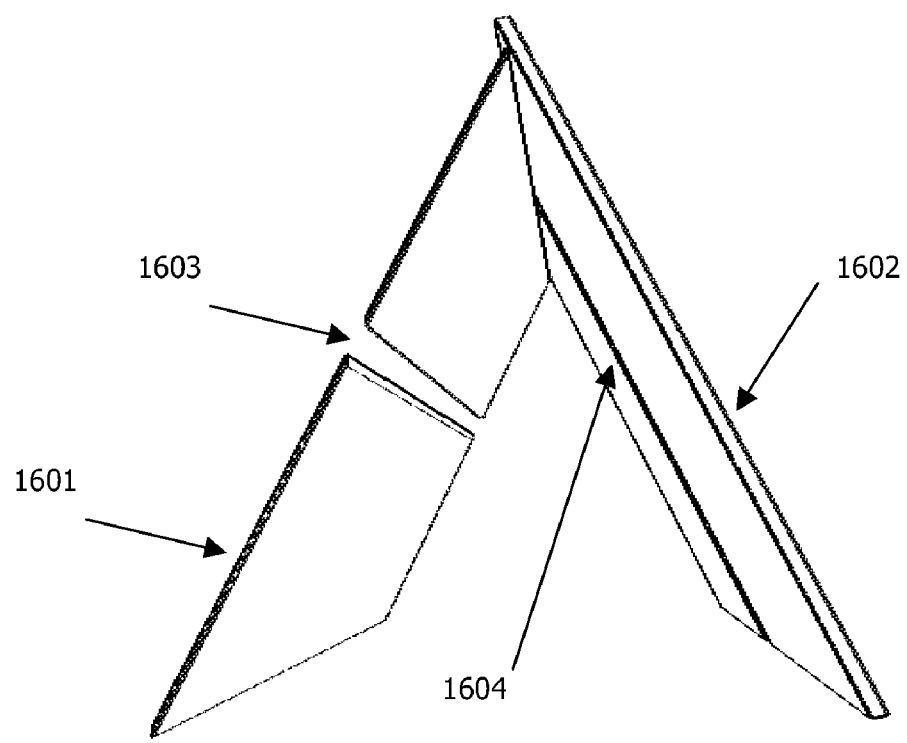
Figure 16C:
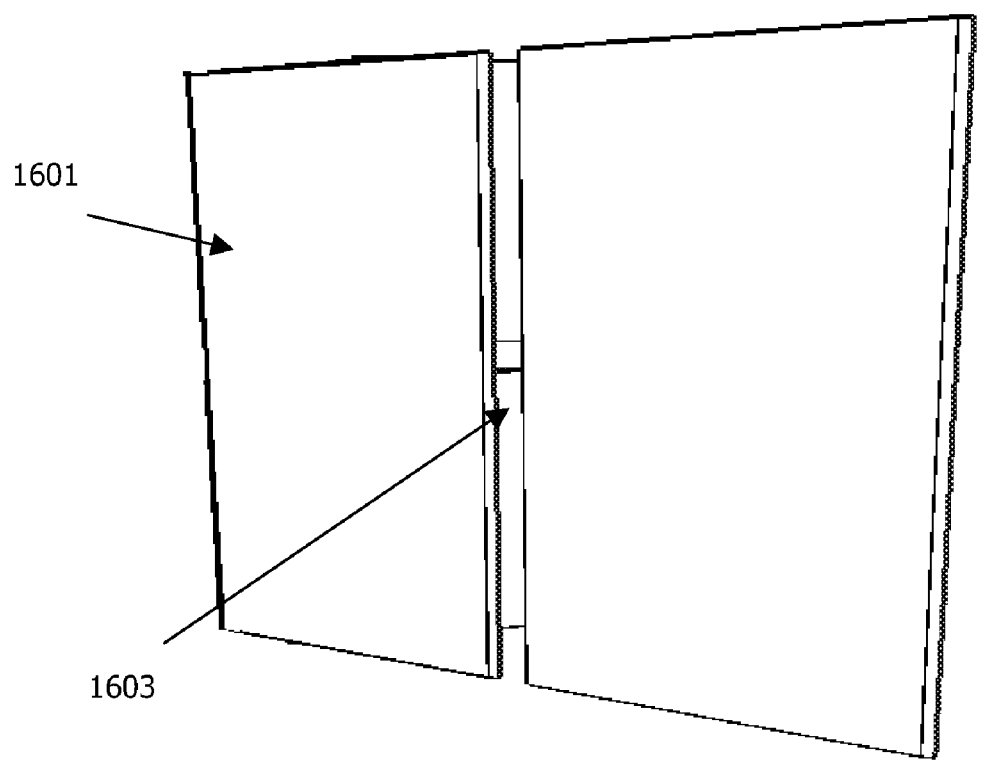

For the calculations, two individual PSDs are still assumed. The arrangement is changed so that an adjacent LED shines on the PSD of the neighbour. So that the two light planes cause one intersection point on the PSD, the jointly used PSD is rotated. The jointly used PSD thus has an orientation, which is rotated at 45° to both light planes. The light planes of the two measuring cells are at right angles to each other. The diaphragm is the movable optical element. It is arranged so that the LED of the partner measuring cell cannot throw its light plane onto the PSD through the wrong slotted diaphragm. The partner slotted diaphragm ("wrong slotted diaphragm") is arranged so that the diaphragm is arranged in the direction of the partner LED and thus no light incidence is possible. The diaphragm uses the degree of freedom (see "Changes with no functional effect on the measuring cell") on the one hand to be the correct slotted diaphragm for its own LED, and on the other hand to stand along the direction of the partner LED and thus shade the light. The diaphragm can be extended at the end, to ensure that no external light from a LED falls on the PSD. FIGS. 16*a* to 16*c* show a possible arrangement, wherein a first diaphragm 1601 and a second diaphragm 1602 are arranged side by side. The slot 1603 of the first and diaphragm 1601 and the slot 1604 of the second diaphragm 1602 are so arranged that the slot 1603 of the first diaphragm 1601 is vertical and the slot 1604 of the second diaphragm 1602 is horizontal.

Figure 17A:
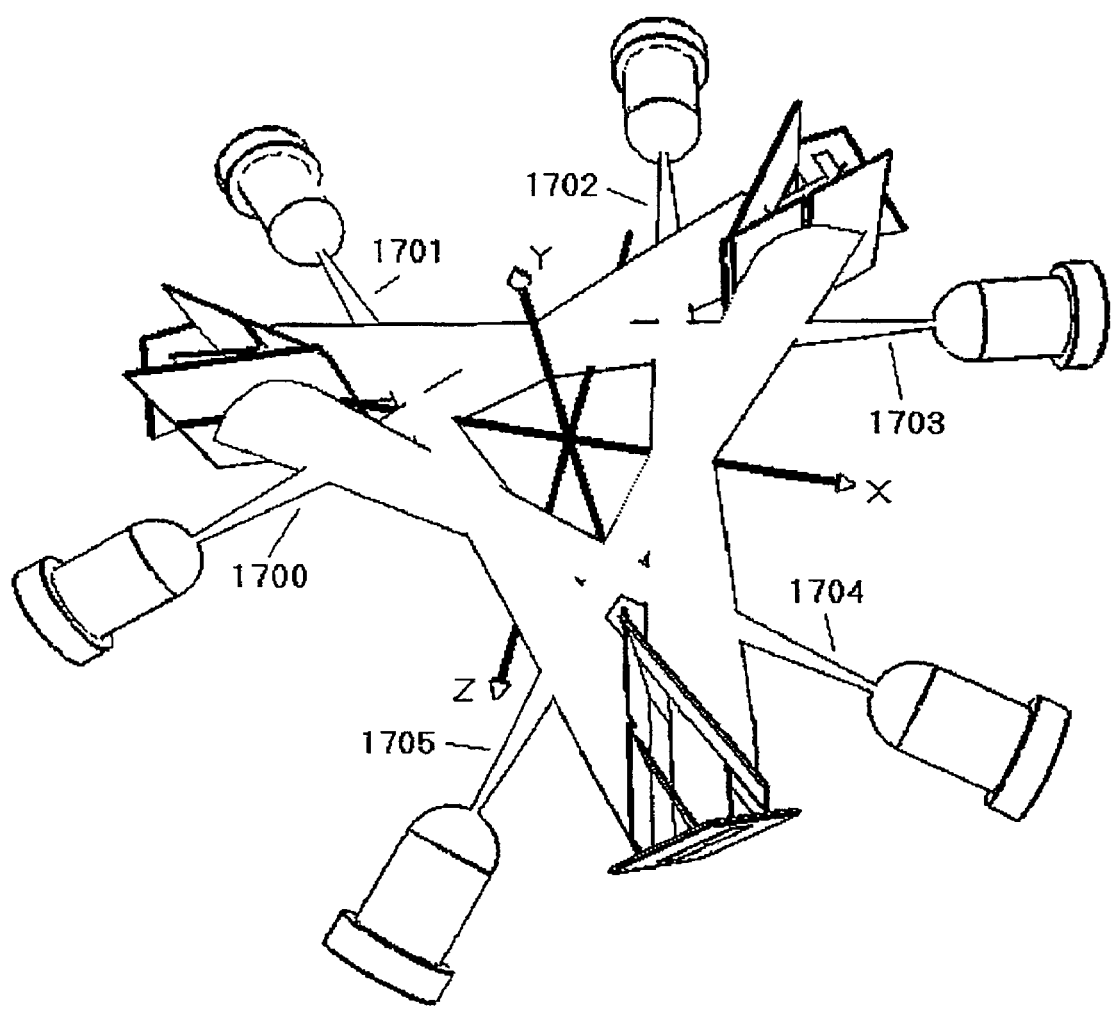
FIG. 17a shows an opto-electronic arrangement according to the invention, consisting of three pairs of measuring cells which are combined with each other, and have the diaphragms according to FIGS. 16a-16c.
Figure 17B:
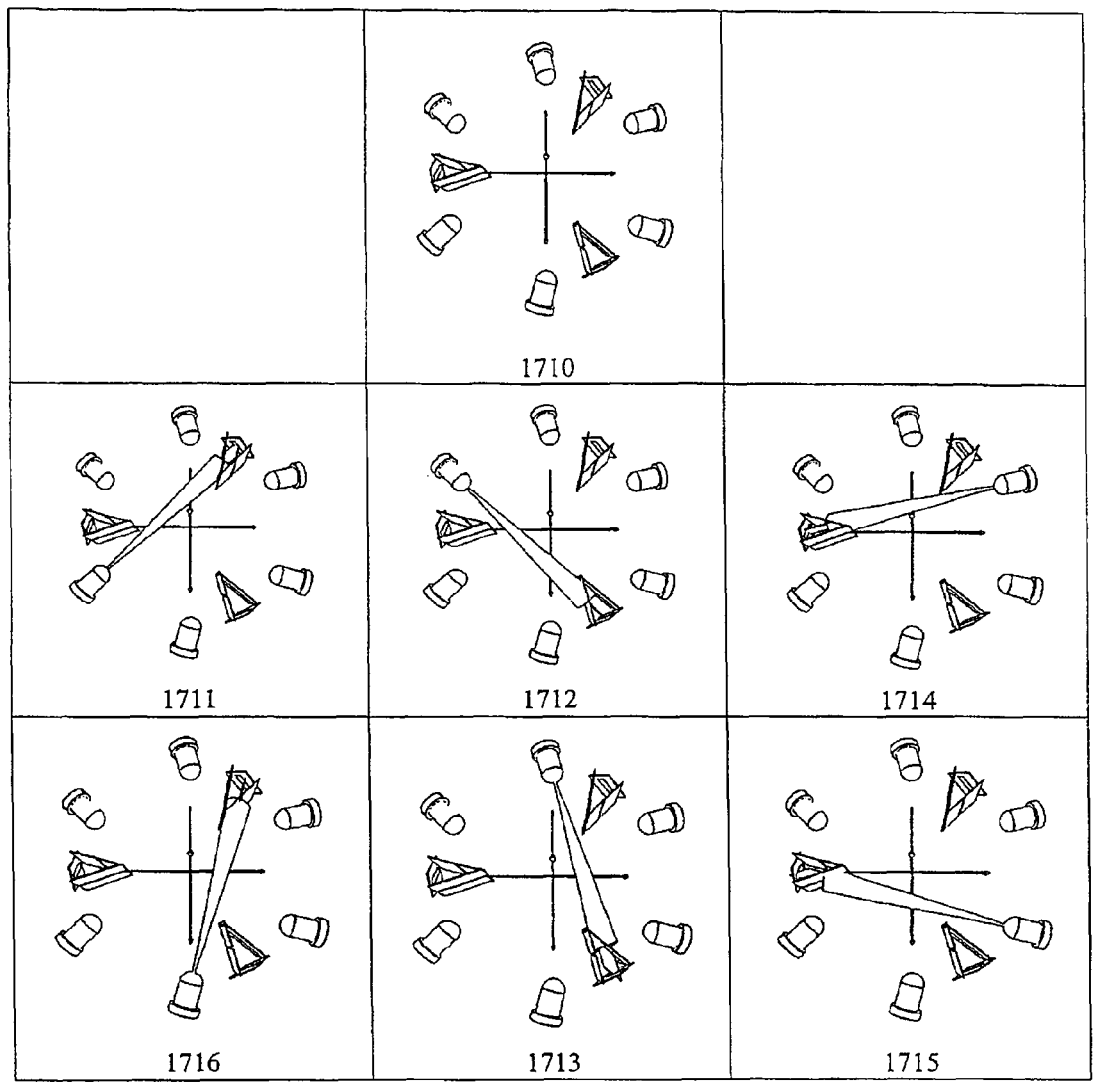
FIG. 17b shows the opto-electronic arrangement according to FIG. 17a, in which each LED is activated alternately (i.e. periodically)

A first measuring cell 1700, a third measuring cell 1702, and a fifth measuring cell 1704, as well as a second measuring cell 1701, a fourth measuring cell 1703, and a sixth measuring cell 1705 form a 3-group respectively. The movements X, Z and C are captured using the first, third, and fifth measuring cells 1700, 1702, 1704. The second, fourth, and sixth measuring cells 1701, 1703, 1705 are responsible for the movements Y, A and B. FIG. 17*a* (diaphragm movable) shows the corresponding arrangement, and in FIG. 17*b* the arrangement is shown with one active LED in each case in order to show the measuring cells and their respective elements.

In frame 1710 no LED is active. In frame 1711, a first LED is active, indicating the first measuring cell 1700. In frame 1712, a second LED is active, indicating the second measuring cell 1701. In frame 1713, a third LED is active, indicating the third measuring cell 1702. In frame 1714, a fourth LED is active, indicating the fourth measuring cell 1703. In frame 1715, a fifth LED is active, indicating the fifth measuring cell 1704. In frame 1716, a sixth LED is active, indicating the sixth measuring cell 1705.

TABLE 17a

|  | 1 | 2 | 3 | 4 | 5 | 6 |
|---|---|---|---|---|---|---|
| LED | −13.8564 | −13.8564 | +0.0000 | +13.8564 | +13.8564 | +0.0000 |
|  | +0.0000 | +0.0000 | +0.0000 | +0.0000 | +0.0000 | +0.0000 |
|  | +8.0000 | −8.0000 | −16.0000 | −8.0000 | +8.0000 | +16.0000 |
| PSDpos | +8.0000 | +8.0000 | +8.0000 | −16.0000 | −16.0000 | +8.0000 |
|  | +0.0000 | +0.0000 | +0.0000 | +0.0000 | +0.0000 | +0.0000 |
|  | −13.8564 | +13.8564 | +13.8564 | +0.0000 | +0.0000 | −13.8564 |
| PSDdir | −0.6124 | −0.6124 | +0.6124 | +0.0000 | +0.0000 | +0.6124 |
|  | +0.7071 | −0.7071 | +0.7071 | −0.7071 | +0.7071 | −0.7071 |
|  | −0.3536 | +0.3536 | −0.3536 | −0.7071 | +0.7071 | +0.3536 |
| IRISpos | +5.2679 | +5.2679 | +7.000 | −12.2679 | −12.2679 | +7.0000 |
|  | +0.0000 | +0.0000 | +0.0000 | +0.0000 | +0.0000 | +0.0000 |
|  | −11.1244 | +11.1244 | +10.1244 | −1.0000 | +1.0000 | −10.1244 |
| IRISdir | −0.1736 | +0.0000 | +0.7660 | +0.0000 | +0.9397 | +0.0000 |
|  | +0.0000 | −1.0000 | +0.0000 | −1.0000 | +0.0000 | −1.0000 |
|  | +0.9848 | +0.0000 | +0.6428 | +0.0000 | −0.3420 | +0.0000 |

TABLE 17b

Translation error 10.7%, rotation error 9.5%

|  | U1 | U2 | U3 | U4 | U5 | U6 |
|---|---|---|---|---|---|---|
| X | +0.0039 | −0.2769 | +0.0023 | −0.1024 | −0.0025 | +0.3785 |
| Y | +0.2059 | −0.0074 | +0.2017 | −0.0054 | +0.1989 | +0.0081 |
| Z | −0.0017 | +0.2849 | −0.0021 | −0.3834 | −0.0023 | +0.0971 |
| A | +1.7543 | −0.0133 | −1.5713 | −0.0174 | −0.1600 | +0.0112 |
| B | −0.0016 | −0.9864 | +0.0066 | −0.9806 | −0.0046 | −0.9682 |
| C | +0.8197 | −0.0179 | +1.0679 | −0.0176 | −1.8984 | +0.0040 |

An identically functioning 3D sensor can be obtained if all PSDs are rotated about the appropriate LEDdir vector with the same angle. The slotted diaphragms must be rotated correspondingly, so that the light planes again fall on the PSDs rotated by 45° (or a similar angle) and form measurable intersection points.

Further Variations for Arranging Measuring Cells

Co-Ordinate Transformation

The individual measuring cells are arranged in a specified Cartesian co-ordinate system. However, the definition of a co-ordinate system is arbitrary. The relationship between two co-ordinate systems is described by a linear co-ordinate transformation. The mapping ensures that the magnitude ratios are unchanged and the relationship of the elements to each other remains the same. Thus for a 3D sensor with 6 degrees of freedom, the co-ordinate system which is used can be arbitrarily defined in space. A 3D sensor can therefore be considered as equivalent if the co-ordinate system which is used can be transferred to a co-ordinate system described here using a linear co-ordinate transformation.

Different Movable Optical Elements

To operate a measuring cell, as well as the fixed optical elements a movable element is also required. In all previous arrangements, it is always assumed that this is of the same type (LED, diaphragm or PSD). Obviously, measuring cells with different movable elements can also be combined with each other. For instance, measuring cells can be arranged with movable diaphragms and movable PSDs. The above rules for arranging 3D sensors remain valid in this case.

Jointly Used Slotted Diaphragm

The movement which can be captured by a measuring cell is described by the movement vector, which is calculated from the product IRISdir×LEDdir. From this it can be seen that with one slotted diaphragm two different movement vectors can be formed, if the directions of the two LEDs are different.

Carrying Signals Via the Springs

It is possible to connect the movable optical element and the two fixed optical elements via wire springs. This connection can also be used for electrical cabling of movable and fixed parts of the sensor. Thus as well as a power supply various control signals can be carried. If the LEDs are the movable optical elements, they can be operated via the springs, for instance in a matrix arrangement.

Movable LEDs to Extend the Working Range

From the equations of "Calculation of a translatory movement", another interesting property becomes clear, and experience confirms it. In the case of a measuring cell with a movable LED, the working range of the movable optical element can be influenced by the arrangement of the fixed optical elements.

In Equation 1 (LED movable), the distance vector PSD-diaphragm is related to the distance vector LED-diaphragm. If the diaphragm is positioned nearer to the PSD than to the LED, this enlarges the movement range of the LED. In the reverse case, the movement range of the LED is restricted, but the smaller movement range is then more finely resolved.

In Equation 2 (diaphragm movable), the distance vector LED-PSD is related to LED-diaphragm. Since the diaphragm must always be in front of the PSD, the distance LED-PSD is always greater than the distance LED-diaphragm. Therefore, in the case of a movable diaphragm, the result can only be a restriction of the movement range.

In Equation 3 (PSD movable), the distance vector LED-diaphragm is in both the numerator and the denominator. The movement range of the PSD is thus always equal, and corresponds to the maximum extent of the light-sensitive part of the PSD.

3D Sensor with More than 6 Measuring Cells

To construct a 3D sensor with 6 degrees of freedom, at least 6 measuring cells are necessary. Obviously, more measuring cells than would actually be required can be used. This redundancy of the 3D sensor can be used to increase the precision of the sensor or to keep the sensor in operation even if one or more measuring cells fail. This applies equivalently to a pan/zoom sensor.

Example Calculation

Figure 18:
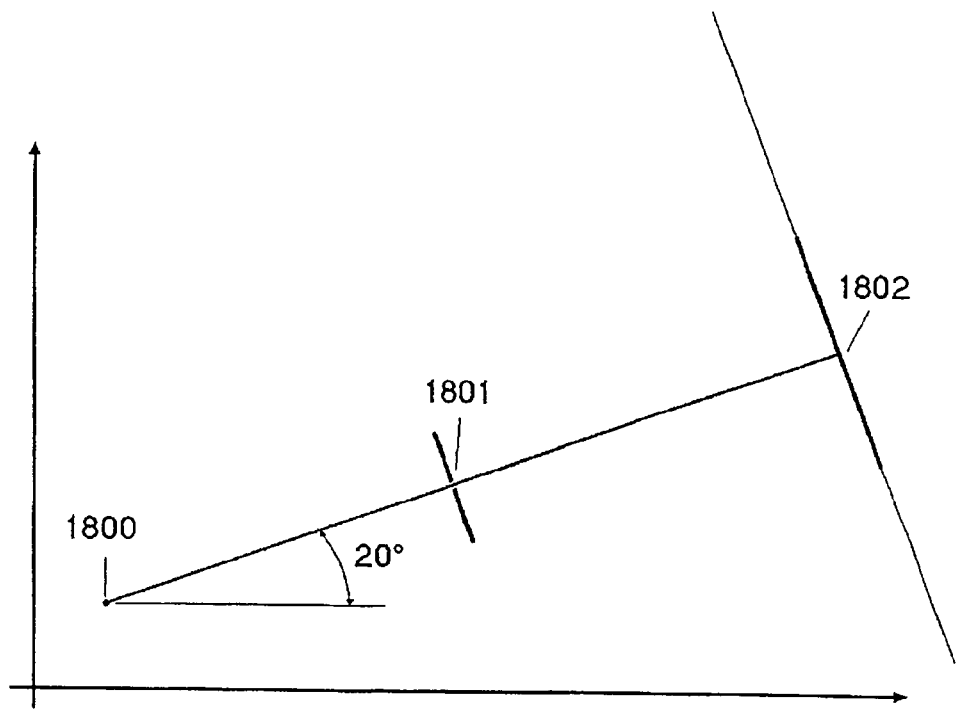
FIG. 18 shows a graphic representation of the elements of a measuring cell.

FIG. 18 shows a graphic representation of the position of the elements, i.e. a LED 1800, a diaphragm 1801 and a PSD 1802, of a measuring cell. The calculation of the magnitude A will be shown for an arrangement as an example. The three possible variants for the movable optical element are taken into account.

TABLE 18

| | 1 |
|---|---|
| LEDpos | +2.0000 |
| | +1.0000 |
| | +0.0000 |
| PSDpos | +13.0000 |
| | +5.0000 |
| | +0.0000 |
| PSDdir | −0.3400 |
| | +0.9400 |
| | +0.0000 |
| IRISpos | +7.0000 |
| | +2.8200 |
| | +0.0000 |
| IRISdir | +0.0000 |
| | +0.0000 |
| | +1.0000 |

1. LED Movable—FIG. 19

Figure 19:
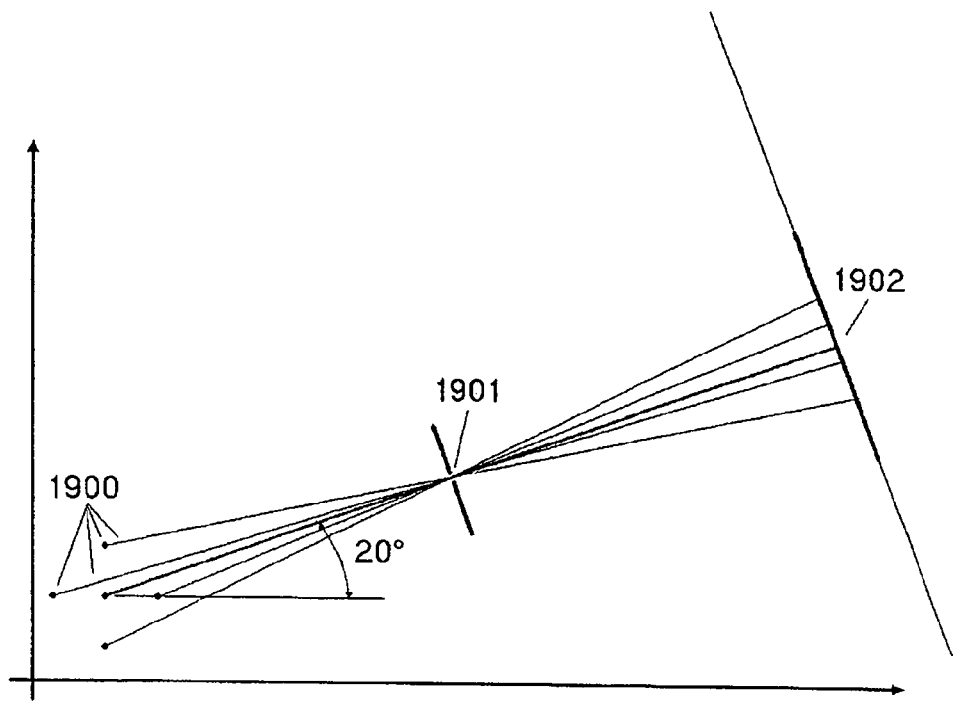
FIG. 19 shows a graphic representation to calculate a translatory movement of the optical element (LED)

No movements of the LED along the direction IRISdir and the direction LEDdir (LEDdir=PSDpos−IRISpos) are capturable for the measuring cell. Thus the measuring cell can capture only movements along IRISdir×LEDdir, which is perpendicular to it. FIG. 19 shows a plurality of different positions for the LED 1900, the respective light beams/planes generated by the LED 1900 and the diaphragm 1901, as well as the respective intersection points on the PSD 1902. The following equation is obtained when the values shown in Table 18 are inserted in the respective formula disclosed in chapter "Calculation of a translatory movement".

$$\lambda = \frac{\text{Translate}\begin{pmatrix} 2.18 \\ -6 \\ 0 \end{pmatrix}}{5.32 + \text{Translate}\begin{pmatrix} -0.94 \\ -0.34 \\ 0 \end{pmatrix}}$$

2. Diaphragm Movable—FIG. 20

Figure 20:
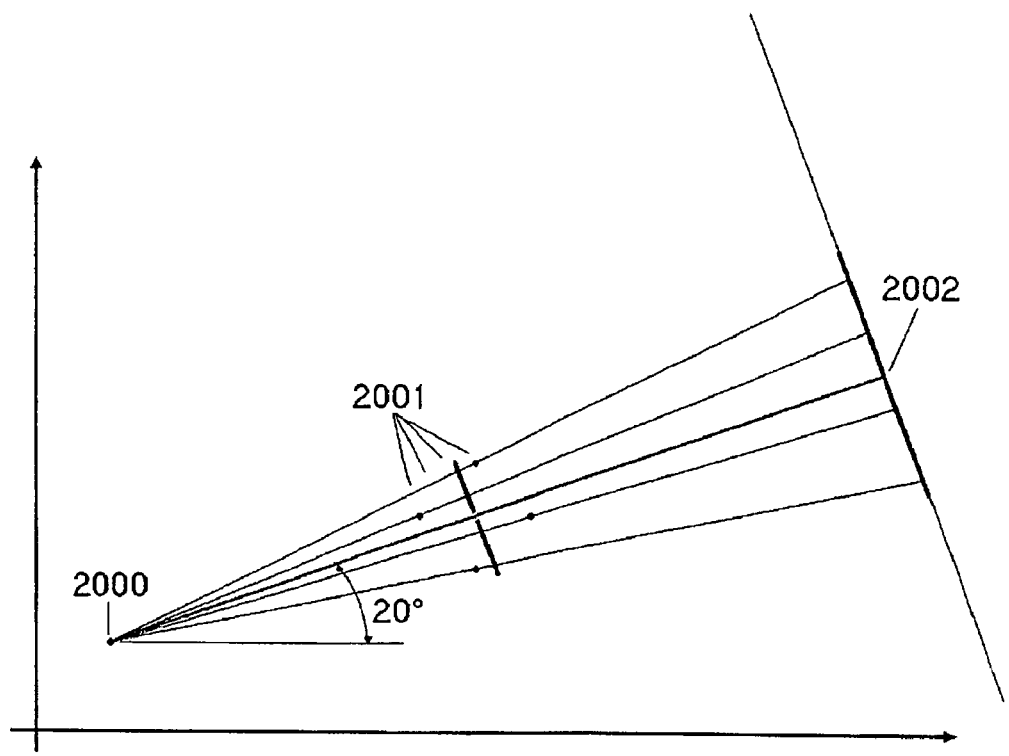
FIG. 20 shows a graphic representation to calculate a translatory movement of the diaphragm.

No movements of the diaphragm along the direction IRISdir and the direction LEDdir (LEDdir=PSDpos−IRISpos) are capturable for the measuring cell. Thus the measuring cell can capture only movements along IRISdir×LEDdir, which is perpendicular to it. FIG. 20 shows a plurality of different positions for the diaphragm 2001, the respective light beams/planes generated by the LED 2000 and the diaphragm 2001, as well as the respective intersections points on the PSD 2002. The following equation is obtained when the values shown in Table 18 are inserted in the respective formula disclosed in chapter "Calculation of a translatory movement".

$$\lambda = \frac{\text{Translate}\begin{pmatrix} -4 \\ 11 \\ 0 \end{pmatrix}}{5.32 + \text{Translate}\begin{pmatrix} 0.94 \\ 0.34 \\ 0 \end{pmatrix}}$$

3. PSD Movable—FIG. 21

Figure 21:
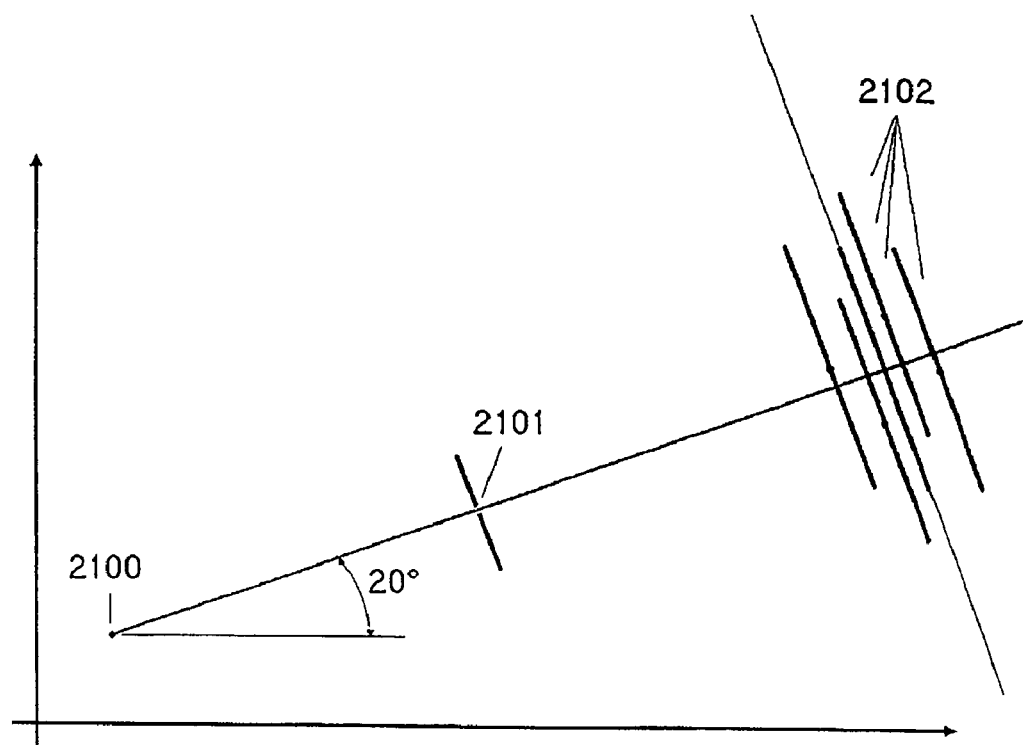
FIG. 21 shows a graphic representation to calculate a translatory movement of the position-sensitive detector (PSD)

No movements of the PDS along the direction IRISdir and the direction LEDdir (LEDdir=PSDpos−IRISpos) are capturable for the measuring cell. Thus the measuring cell can capture only movements along IRISdir×LEDdir, which is perpendicular to it. FIG. 21 shows a plurality of different positions for the PSD 2102, the respective light beams/planes generated by the LED 2100 and the diaphragm 2101, as well as the respective intersections points on the PSD 2102. The following equation is obtained when the values shown in Table 18 are inserted in the respective formula disclosed in chapter "Calculation of a translatory movement".

$$\lambda = \frac{\text{Translate}\begin{pmatrix} 1.82 \\ -5 \\ 0 \end{pmatrix}}{5.32}$$

Figure 22:
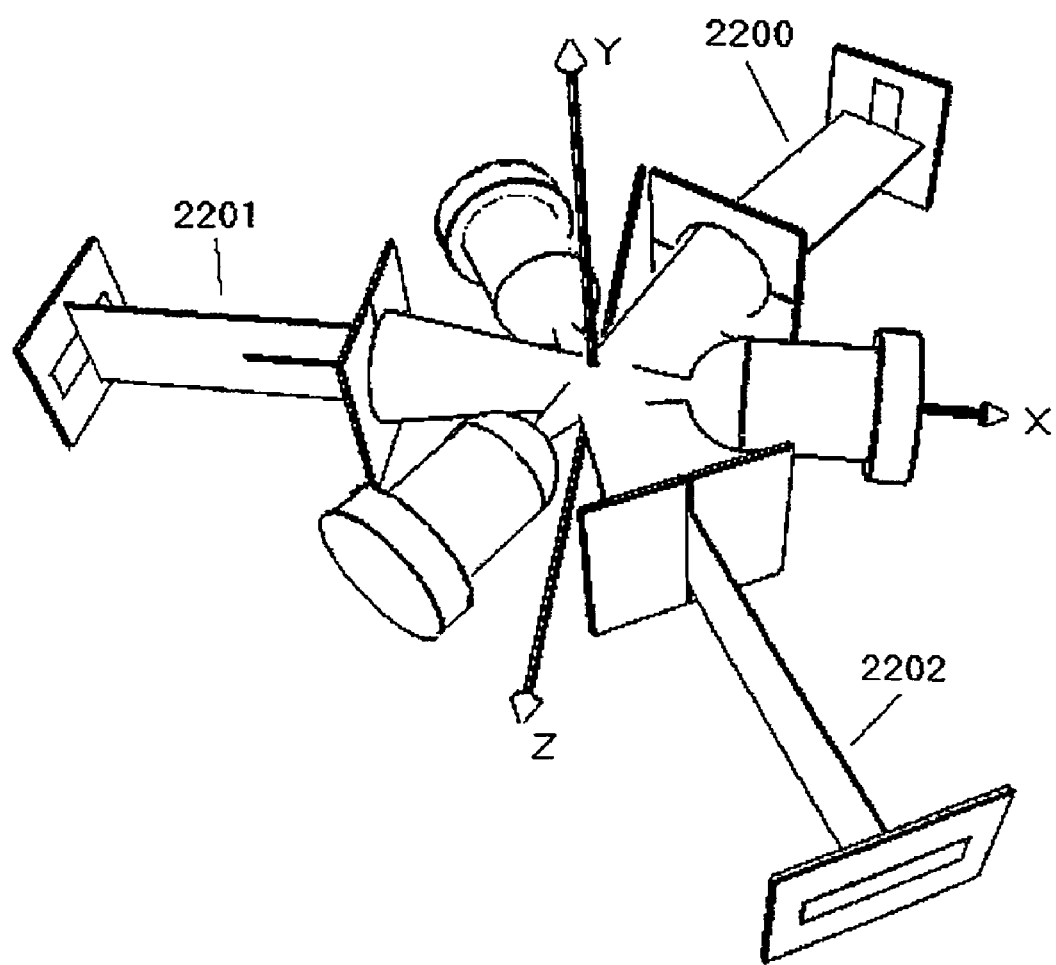
FIG. 22 shows a further opto-electronic arrangement according to the invention, consisting of three measuring cells in the same plane.

Alternative Arrangement According to FIG. 22 (LED Movable)

TABLE 22a

| | 1 | 2 | 3 |
|---|---|---|---|
| LEDpos | −2.0000 | +4.0000 | −2.0000 |
| | +0.0000 | +0.0000 | +0.0000 |
| | +3.4640 | +0.0000 | −3.4640 |
| PSDpos | +7.5000 | −15.0000 | +7.5000 |
| | +0.0000 | +0.0000 | +0.0000 |
| | −12.9900 | +0.0000 | +12.9900 |
| PSDdir | +0.0000 | +0.0000 | +0.8660 |
| | +1.0000 | +0.0000 | +0.0000 |
| | +0.0000 | +1.0000 | −0.5000 |
| IRISpos | +3.0000 | −6.0000 | +3.0000 |
| | +0.0000 | +0.0000 | +0.0000 |
| | −5.1960 | +0.0000 | +5.1960 |
| IRISdir | −0.8660 | +0.0000 | +0.0000 |
| | +0.0000 | +1.0000 | +1.0000 |
| | −0.5000 | +0.0000 | +0.0000 |

TABLE 22b

| | U1 | U2 | U3 |
|---|---|---|---|
| X | +0.0009 | −0.6304 | −1.2836 |
| Y | −1.1051 | −0.0010 | −0.0010 |
| Z | −0.0016 | −1.1044 | −0.0087 |

Translation error 9.8%

In this embodiment of the invention, which is illustrated in FIG. 22, only the LEDs are movable, and they are in or near the centre of rotation. A first measuring cell 2200, a second measuring cell 2201, and a third measuring cell 2202 are arranged in the X/Z plane. The measuring cells can capture translatory movements only, and are "blind" for rotational movements.

The sensor structure is therefore suitable only for pan/zoom applications, and not for applications with 6 degrees of freedom (6 DOF). The design aim for a pan/zoom sensor is therefore to relocate the movable element into the centre of rotation.

In this description, if it is said that a measuring cell can capture "generally only" or "exclusively" translatory movements, this means that the measuring cell or sensor can to measure exclusively translatory movements, at least in a first approximation. Rotational movements can also have a small influence on the measurement. This part is small and therefore negligible, but nevertheless present. The result of the displacement and rotation of the sensor is that in the sensor the individual measuring cells slightly leave their ideal positions (e.g. the movable element is no longer exactly in the centre of rotation), so that small errors occur.

This situation is handled using the following method:

Method of determining relative movements or relative positions of two objects in an arrangement according to the invention, which can capture translatory and rotational movements or generally translatory movements only, with the steps:

one specifies the exact equations for the captured movements of the measuring cells; (see page 13 from line 1)

one specifies a first approximation, which ignores the coupled movements between rotation and/or translation; (see chapter "Calculation of a translatory movement") or for each measuring cell, one specifies the calibration matrix of the linearisation and the maximum error.

REFERENCE SYMBOL LIST

101 LED
102 light cone
103 diaphragm
104 light plane
105 PSD
201 LEDpos
203 IRISpos
205 PSDpos
211 IRISdir
212 PSDdir
213 LEDdir
214 PSDdir×LEDdir
215 IRISdir×LEDdir
216 ⊥LEDdir 1
217 ⊥LEDdir 2
301 light plane
302 PSD
303 intersection plane
304 intersection point
401 PSD
402 diaphragm
403 diaphragm distance
404 displacement X
405 displacement Y
406 LED
701-1 LED of first measuring cell
701-2 LED of second measuring cell
701-3 LED of third measuring cell
701-4 LED of fourth measuring cell
701-5 LED of fifth measuring cell
701-6 LED of sixth measuring cell
703-1 diaphragm of first measuring cell
703-2 diaphragm of second measuring cell
703-3 diaphragm of third measuring cell
703-4 diaphragm of fourth measuring cell
703-5 diaphragm of fifth measuring cell
703-6 diaphragm of sixth measuring cell
705-1 PSD of first measuring cell
705-2 PSD of second measuring cell
705-3 PSD of third measuring cell
705-4 PSD of fourth measuring cell
705-5 PSD of fifth measuring cell
705-6 PSD of sixth measuring cell
801 LED
804 light plane
901-1 LED of first measuring cell
901-5 LED of fifth measuring cell
901-6 LED of sixth measuring cell
904-1 light plane of first measuring cell
904-5 light plane of fifth measuring cell
904-6 light plane of sixth measuring cell
905-1 PSD of first measuring cell
905-2 PSD of second measuring cell
905-4 PSD of fourth measuring cell
905-5 PSD of fifth measuring cell
905-6 PSD of sixth measuring cell
1001 first measuring cell
1002 second measuring cell
1003 third measuring cell
1100 first measuring cell
1101 first movement vector
1102 second measuring cell
1103 second movement vector
1104 third measuring cell
1105 third movement vector
1300 first measuring cell
1301 second measuring cell
1302 third measuring cell
1303 fourth measuring cell
1304 fifth measuring cell
1305 sixth measuring cell 6
1400 first measuring cell
1401 second measuring cell
1402 third measuring cell
1403 fourth measuring cell
1404 fifth measuring cell
1405 sixth measuring cell
1500 first measuring cell
1501 second measuring cell
1502 third measuring cell
1503 fourth measuring cell
1504 fifth measuring cell
1505 sixth measuring cell
1601 first diaphragm
1602 second diaphragm
1603 slot of first diaphragm
1604 slot of second diaphragm
1700 first measuring cell
1701 second measuring cell
1702 third measuring cell
1703 fourth measuring cell
1704 fifth measuring cell
1705 sixth measuring cell
frame 1710 no LED active
frame 1711 first LED active
frame 1712 second LED active
frame 1713 third LED active
frame 1714 fourth LED active
frame 1715 fifth LED active
frame 1716 sixth LED active
1800 LED
1801 diaphragm
1802 PSD
1900 LED
1901 diaphragm
1902 PSD
2000 LED
2001 diaphragm
2002 PSD
2100 LED
2101 diaphragm
2102 PSD
2200 first measuring cell
2201 second measuring cell
2202 third measuring cell

The invention claimed is:
1. An opto-electronic arrangement to capture relative movements or relative positions of two objects, comprising at least one position-sensitive detector (PSD), wherein a given PSD of the at least one PSD is illuminated by at least two light emission devices, to define two different measuring cells having the given PSD in common, each of the two different measuring cells which are defined by the common PSD further comprise a slotted diaphragm which is arranged in a beam path of a corresponding light emission device, between the corresponding light emission device and the common PSD, one element of each of the at least two different measuring cells, comprising a light emission device, a slotted diaphragm and detector, is movable relative to the other two elements, and the common PSD is illuminated alternately by the light emission devices of the two different measuring cells, and a measurement value of the detector is read out simultaneously.

2. The opto-electronic arrangement according to claim 1, wherein each PSD of the at least one PSD is functionally associated with two adjacent slotted diaphragms.

3. The opto-electronic arrangement according to claim 1, wherein a slot direction of at least one of the slotted diaphragms is aligned diagonally in relation to a light-sensitive part of the common PSD.

4. The opto-electronic arrangement according to claim 1, wherein a light plane, which shines through at least one of the slotted diaphragms of at least one of the two different measuring cells falls on the common PSD, encloses an acute angle with a plane of a light-sensitive part of the common PSD.

5. The opto-electronic arrangement according to claim 4, wherein the common PSD of each of the at least two different measuring cells is illuminated by only one light emission device at a particular time, and the measurement value of the common PSD is read out simultaneously.

6. The opto-electronic arrangement according to claim 1, wherein the movable element is arranged in the centre of rotation of a given measuring cell, wherein the measuring cell mainly captures only translatory movements of the moveable element.

7. An opto-electronic arrangement to capture relative movements or relative positions of two objects, comprising:
a measuring cell comprising:
a light emission device;
at least one position-sensitive detector, the at least one position-sensitive detector being illuminated by the light emission device; and
a slotted diaphragm arranged in a beam path of the light emission device between the light emission device and the position-sensitive detector, such that an entire light plane which shines through the slotted diaphragm and falls on the at least one position-sensitive detector is oriented at an acute angle in relation to an entire light-sensitive part of the position-sensitive detector, wherein
one element of the measuring cell, consisting one of the light emission device, the slotted diaphragm and the position-sensitive detector, is movable relative to the other two elements of the measuring cell.

8. The opto-electronic arrangement according to claim 7, wherein a slot direction of the slotted diaphragm is aligned diagonally in relation to the light-sensitive part of the position-sensitive detector.

9. The opto-electronic arrangement according to claim 7, wherein the light plane encloses an acute angle with a plane of the light-sensitive part of the position-sensitive detector.

10. The opto-electronic arrangement according to claim 9, wherein a slot direction of the slotted diaphragm runs essentially perpendicularly to the light-sensitive part of the position-sensitive detector.

11. The opto-electronic arrangement according to claim 7, wherein the movable element is arranged in a centre of rotation of the measuring cell, such that the measuring cell exclusively captures translatory movements of the movable element.

12. The opto-electronic arrangement according to claim 7, wherein the measuring cell is a first measure cell, the opto-electronic arrangement further comprising:
a second measuring cell, different from the first measuring cell, the second measuring cell comprising:
a slotted diaphragm configured such that the position-sensitive detector of the first measuring cell is associated with two different slotted diaphragms.

13. The opto-electronic arrangement according to claim 12, wherein the two slotted diaphragms are adjacent.

14. The opto-electronic arrangement according to claim 13, wherein the second measuring cell further comprises a light emission device configured to illuminate the slotted diaphragm of the second measuring cell.

15. The opto-electronic arrangement according to claim 13, wherein the two adjacent slotted diaphragms have slots which are arranged perpendicularly to each other.

16. The opto-electronic arrangement according to claim 13, wherein the two adjacent slotted diaphragms enclose an angle together.

17. An opto-electronic arrangement to capture relative movements or relative positions of two objects, comprising a plurality of position-sensitive detectors, each position-sensitive detector being illuminated by an associated light emission device, to define a measuring cell, wherein
each of the measuring cells comprises a slotted diaphragm arranged in a beam path of an associated light emission device between the associated light emission device and an associated position-sensitive detector of the plurality of position-sensitive detectors, wherein a detector axis of the associated position-sensitive detector is aligned essentially perpendicularly to a slot direction of the slotted diaphragm, and
axes of two position-sensitive detectors of the plurality of position-sensitive detectors in the given group of measuring cells are essentially arranged parallel to each other or axes of two position-sensitive detectors of the plurality of position-sensitive detectors in the given group of measuring cells are essentially arranged perpendicularly to each other, and wherein
the measuring cells are arranged in groups, such that the beam paths of the measuring cells of a given group of measuring cells are essentially arranged parallel or perpendicularly to the beam paths of other measuring cells in the given group, and
the beam paths of the measuring cells are arranged in a common plane.

18. The opto-electronic arrangement according to claim 17, wherein one element of each measuring cell, consisting of a light emission device, a slotted diaphragm and a position-sensitive detector of the plurality of position sensitive detectors, is movable relative to the other two elements.

19. The opto-electronic arrangement according to claim 18, wherein the movable element is arranged in the centre of rotation of a given measuring cell, such that the given measuring cell is configured to mainly capture only translatory movements of the moveable element.

20. An opto-electronic arrangement to capture relative movements or relative positions of two objects, the opto-electronic arrangement comprising:
  at least two position-sensitive detectors, each position-sensitive detector being illuminated by a light emission device, to define a measuring cell, an orientation of a measuring cell being determined by the axis normal to the plane of the position-sensitive detector, wherein
    the position-sensitive detectors and light emission devices are arranged in a common plane, and the at least two-position-sensitive detectors are configured such that two different measuring cells are arranged parallel to Cartesian axes,
    each measuring cell comprises a slotted diaphragm arranged in a beam path of an associated light emission device between the associated light emission device and the position-sensitive detector, a detector axis of the position-sensitive detector being aligned essentially perpendicularly to a slot direction of the slotted diaphragm,
    one element of each measuring cell, comprising a light emission device, a slotted diaphragm and a position-sensitive detector, is movable relative to the other two elements, and wherein
    the two different measuring cells are oriented essentially parallel to each other or the two different measuring cells are oriented essentially perpendicularly to each other.

21. The opto-electronic arrangement according to claim 20, wherein the movable element is arranged in a centre of rotation of a given measuring cell, such that the given measuring cell exclusively captures translatory movements of the moveable element.

22. The opto-electronic arrangement according to claim 1, wherein the opto-electronic arrangement includes at least three measuring cells.

23. The opto-electronic arrangement according to claim 22, wherein the opto-electronic arrangement includes more than six measuring cells.

24. The opto-electronic arrangement according to claim 1, wherein a given measuring cell consisting of a light emission device, a slotted diaphragm and a position-sensitive detector is provided with a movable light emission device, the given measuring cell having a given working range or movement range.

25. A force and/or moment sensor, comprising an opto-electronic arrangement to capture relative movements or relative positions of two objects according to claim 1.

26. The force and/or moment sensor according to claim 25, wherein the two objects consist of a first plate and a second plate, the two objects being elastically joined to each other and movable relative to each other.

27. The force and/or moment sensor according to claim 26, wherein the first and second plates are joined to each other via at least one of a spring device and a damping device.

28. The force and/or moment sensor according to claim 27, wherein the at least one of the spring and the damping device, is configured to carry electrical signals of the first and second plates.

29. The force and/or moment sensor according to claim 27, wherein the at least one of the spring device and the damping device comprises at least one of: a helical spring, a spring assembly, an elastomer, and a cast resin.

30. The force and/or moment sensor according to claim 27, wherein the at least one of the spring device and the damping device are essentially arranged with rotational symmetry.

31. The force and/or moment sensor according to claim 27, wherein at least one of the spring devices and/or damping devices includes at least one elastomer element or spring element, which is permanently joined to the first and second plates.

32. The force and/or moment sensor according to claim 26, wherein at least one limit stop device, which limits the movement of the first plate relative to the second plate.

33. The force and/or moment sensor according to claim 25, wherein the sensor exclusively captures translatory movements of the two objects.

34. A pan/zoom sensor with a first plate and a second plate, which are elastically joined to each other and movable relative to each other, the pan/zoom sensor comprising an opto-electronic arrangement to capture relative movements or relative positions of two objects according to claim 1.

35. The pan/zoom sensor according to claim 34, the sensor being geometrically configured to exclusively capture translatory movements of the first and second plates.

36. A PC keyboard, comprising a force and/or movement sensor according to claim 25.

* * * * *

UNITED STATES PATENT AND TRADEMARK OFFICE
CERTIFICATE OF CORRECTION

PATENT NO. : 8,089,039 B2 Page 1 of 1
APPLICATION NO. : 11/253406
DATED : January 3, 2012
INVENTOR(S) : Antonio Pascucci et al.

It is certified that error appears in the above-identified patent and that said Letters Patent is hereby corrected as shown below:

Title Page, Item (54) and at Column 1, lines 2-3, in the title, delete "OR RELATIVE MOVEMENTS"

Signed and Sealed this
Sixth Day of March, 2012

David J. Kappos
*Director of the United States Patent and Trademark Office*